No. 717,169. Patented Dec. 30, 1902.
F. B. CONVERSE, Jr.
TYPE SETTING AND JUSTIFYING MACHINE.
(Application filed Dec. 19, 1898.)

(No Model.) 18 Sheets—Sheet I.

WITNESSES
E. B. Gilchrist
Philip E. Knowlton

INVENTOR
Francis B. Converse, Jr.
By his Attorneys,
Thurston & Bates

No. 717,169. Patented Dec. 30, 1902.
F. B. CONVERSE, Jr.
TYPE SETTING AND JUSTIFYING MACHINE.
(Application filed Dec. 19, 1898.)
(No Model.) 18 Sheets—Sheet 4.

WITNESSES
E. B. Gilchrist
Philip E. Knowlton

INVENTOR
Francis B. Converse Jr.
By his Attorneys,
Thurston & Bates

No. 717,169. Patented Dec. 30, 1902.
F. B. CONVERSE, Jr.
TYPE SETTING AND JUSTIFYING MACHINE.
(Application filed Dec. 19, 1898.)
(No Model.) 18 Sheets—Sheet 7.

WITNESSES.
E. B. Gilchrist
Philip E. Knowlton

INVENTOR.
Francis B. Converse Jr.
By his Attorneys,
Thurston & Bates

No. 717,169. Patented Dec. 30, 1902.
F. B. CONVERSE, Jr.
TYPE SETTING AND JUSTIFYING MACHINE.
(Application filed Dec. 19, 1898.)

(No Model.) 18 Sheets—Sheet 9.

WITNESSES:
E. B. Gilchrist
Philip E. Knowlton

INVENTOR.
Francis B. Converse, Jr.
By his Attorneys,
Thurston & Bates.

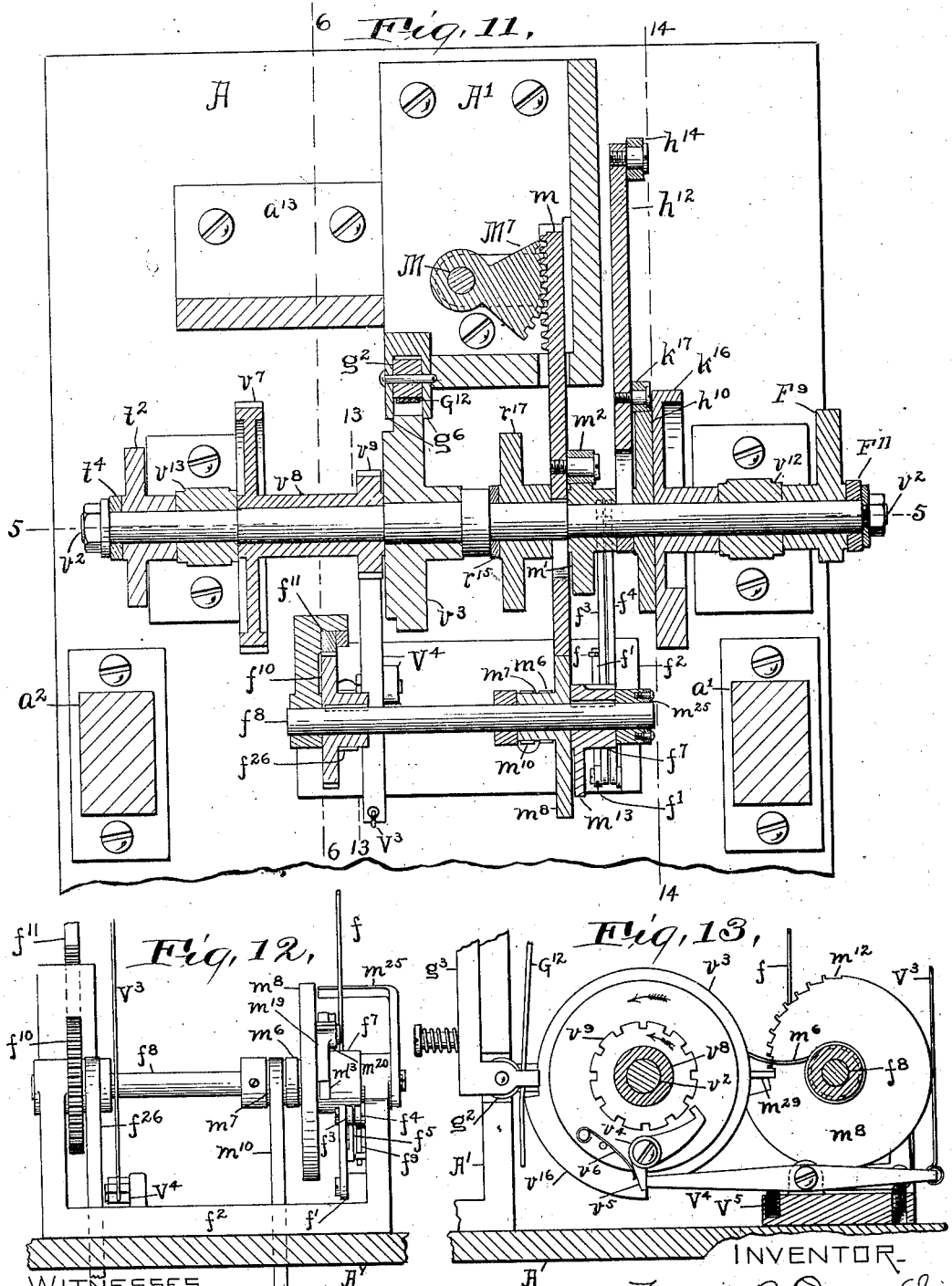

No. 717,169. Patented Dec. 30, 1902.
F. B. CONVERSE, Jr.
TYPE SETTING AND JUSTIFYING MACHINE.
(Application filed Dec. 19, 1898.)
(No Model.) 18 Sheets—Sheet 12.
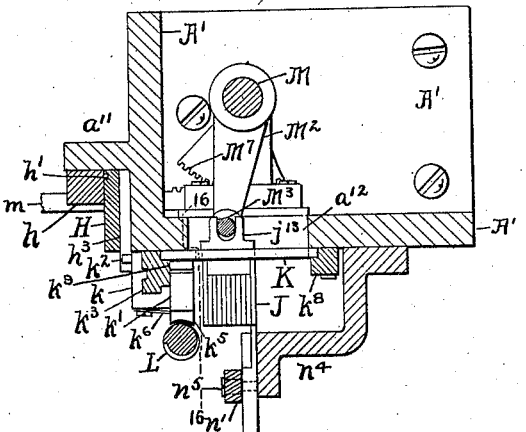
Fig. 15.
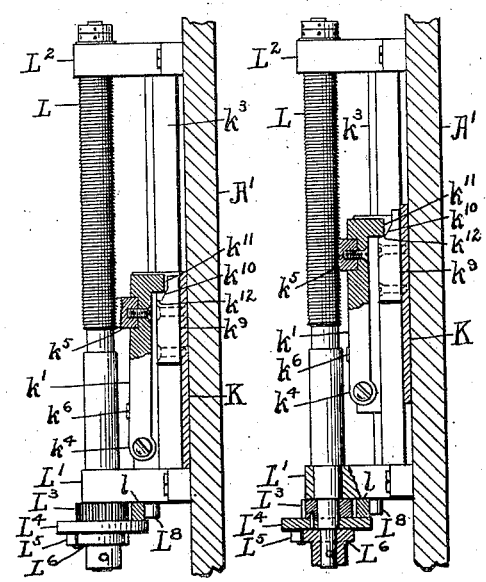
Fig. 16. Fig. 17.
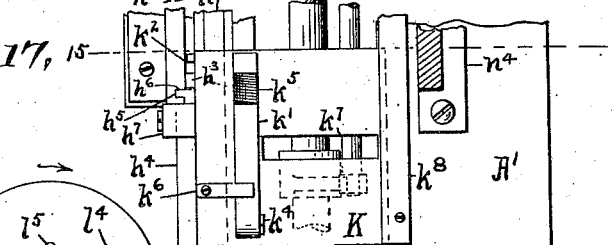
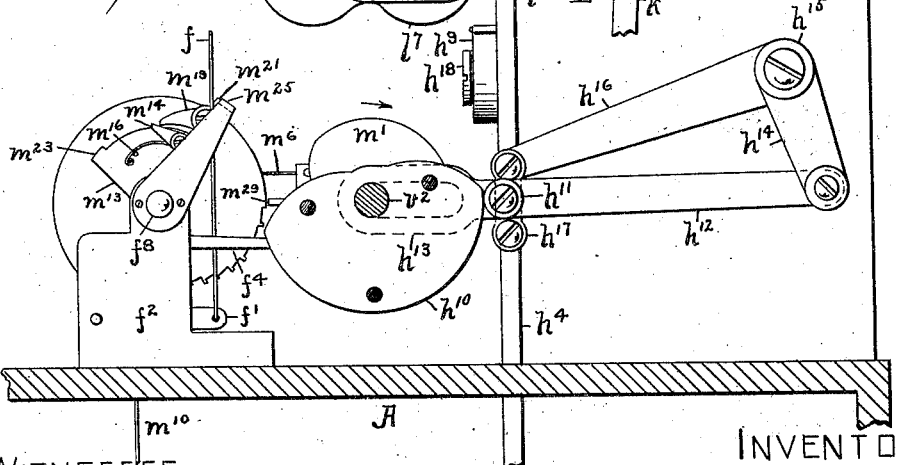
Fig. 14.
WITNESSES.
E. B. Gilchrist
Philip E. Knowlton
INVENTOR
Francis B. Converse, Jr.
By his attorneys,
Thurston & Bates.

No. 717,169. Patented Dec. 30, 1902.
F. B. CONVERSE, Jr.
TYPE SETTING AND JUSTIFYING MACHINE.
(Application filed Dec. 19, 1898.)
(No Model.) 18 Sheets—Sheet 13.
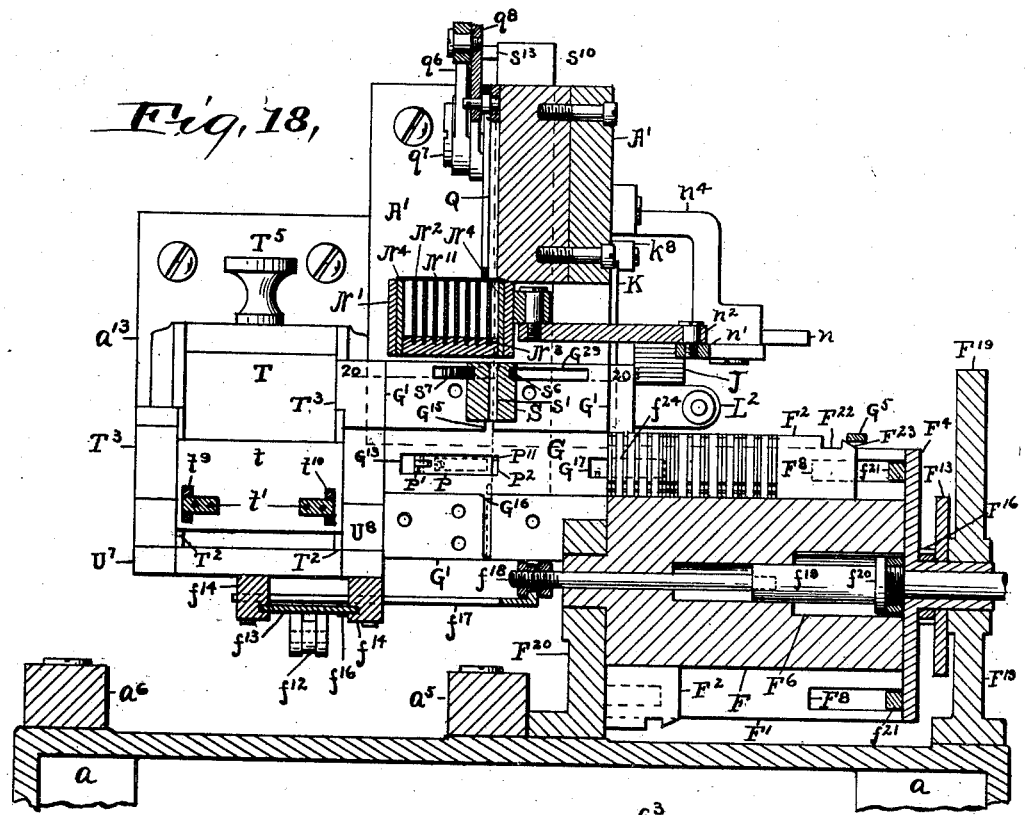
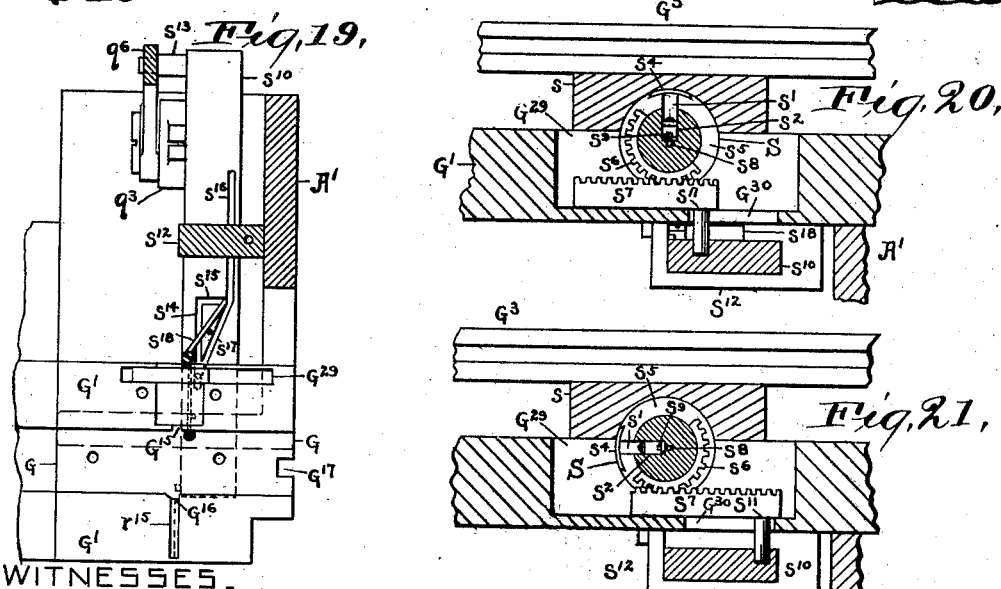
WITNESSES.
E. B. Gilchrist
Philip E. Knowlton
INVENTOR.
Francis B. Converse Jr.
By his Attorneys,
Thurston & Bates.

No. 717,169. Patented Dec. 30, 1902.
F. B. CONVERSE, Jr.
TYPE SETTING AND JUSTIFYING MACHINE.
(Application filed Dec. 19, 1898.)
(No Model.) 18 Sheets—Sheet 14.
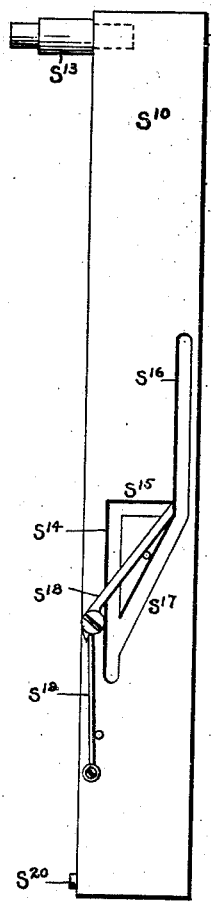
Fig. 22.
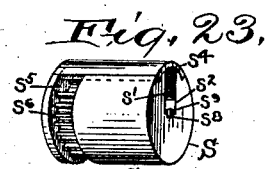
Fig. 23.
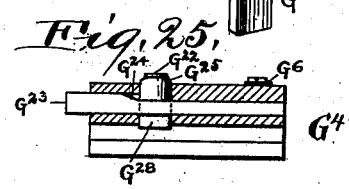
Fig. 24.
Fig. 25.
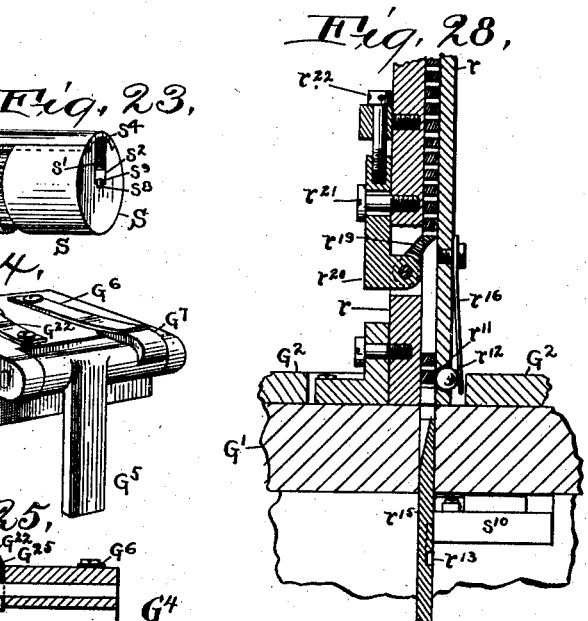
Fig. 28.
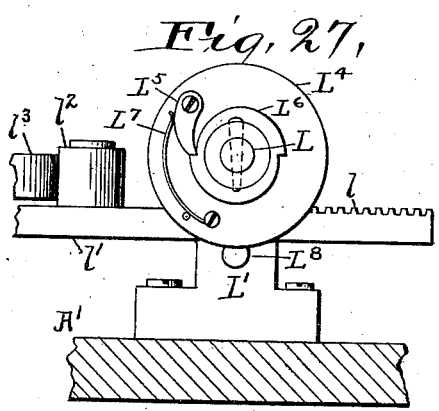
Fig. 26. Fig. 27.
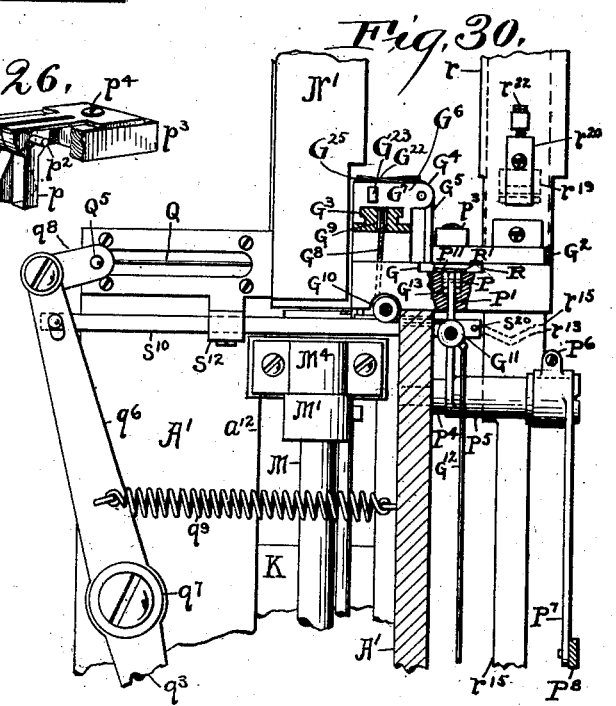
Fig. 30.
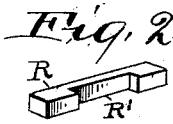
Fig. 29.
WITNESSES
E. B. Gilchrist
Philip E. Knowlton
INVENTOR
Francis B. Converse, Jr.
By his Attorneys
Thurston & Bates No. 717,169. Patented Dec. 30, 1902.
F. B. CONVERSE, Jr.
TYPE SETTING AND JUSTIFYING MACHINE.
(Application filed Dec. 19, 1898.)
(No Model.) 18 Sheets—Sheet 15.
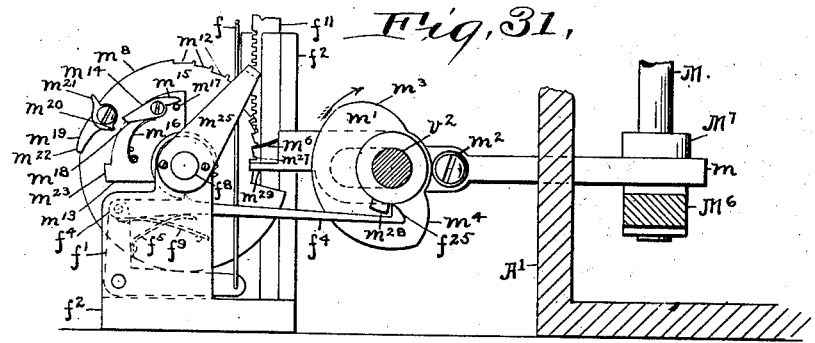
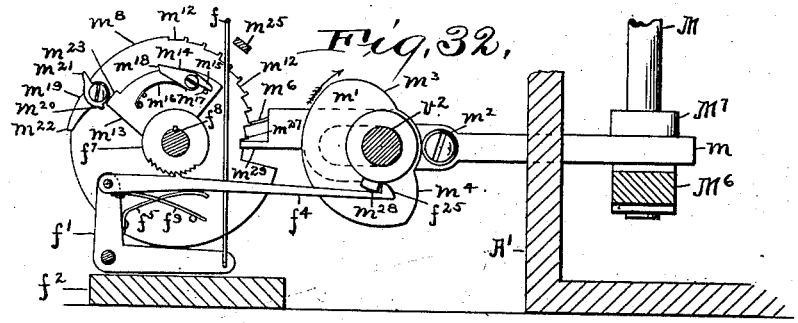
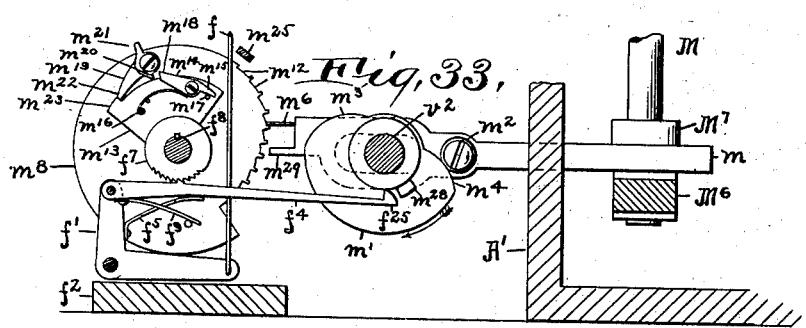
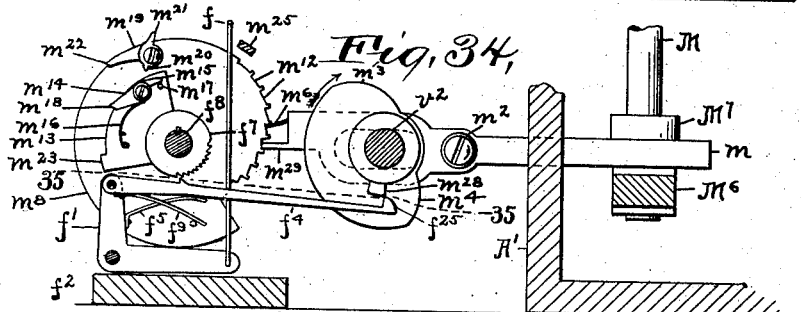
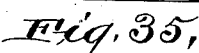
WITNESSES
E. B. Gilchrist
Philip E. Knowlton
INVENTOR
Francis B. Converse, Jr.
By his Attorneys,
Thurston & Bates No. 717,169. Patented Dec. 30, 1902.
F. B. CONVERSE, Jr.
TYPE SETTING AND JUSTIFYING MACHINE.
(Application filed Dec. 19, 1898.)

(No Model.) 18 Sheets—Sheet 16.

WITNESSES.
E. B. Gilchrist
P. E. Knowlton

INVENTOR.
Francis B. Converse, Jr.
By his Attorneys,
Thurston & Bates.

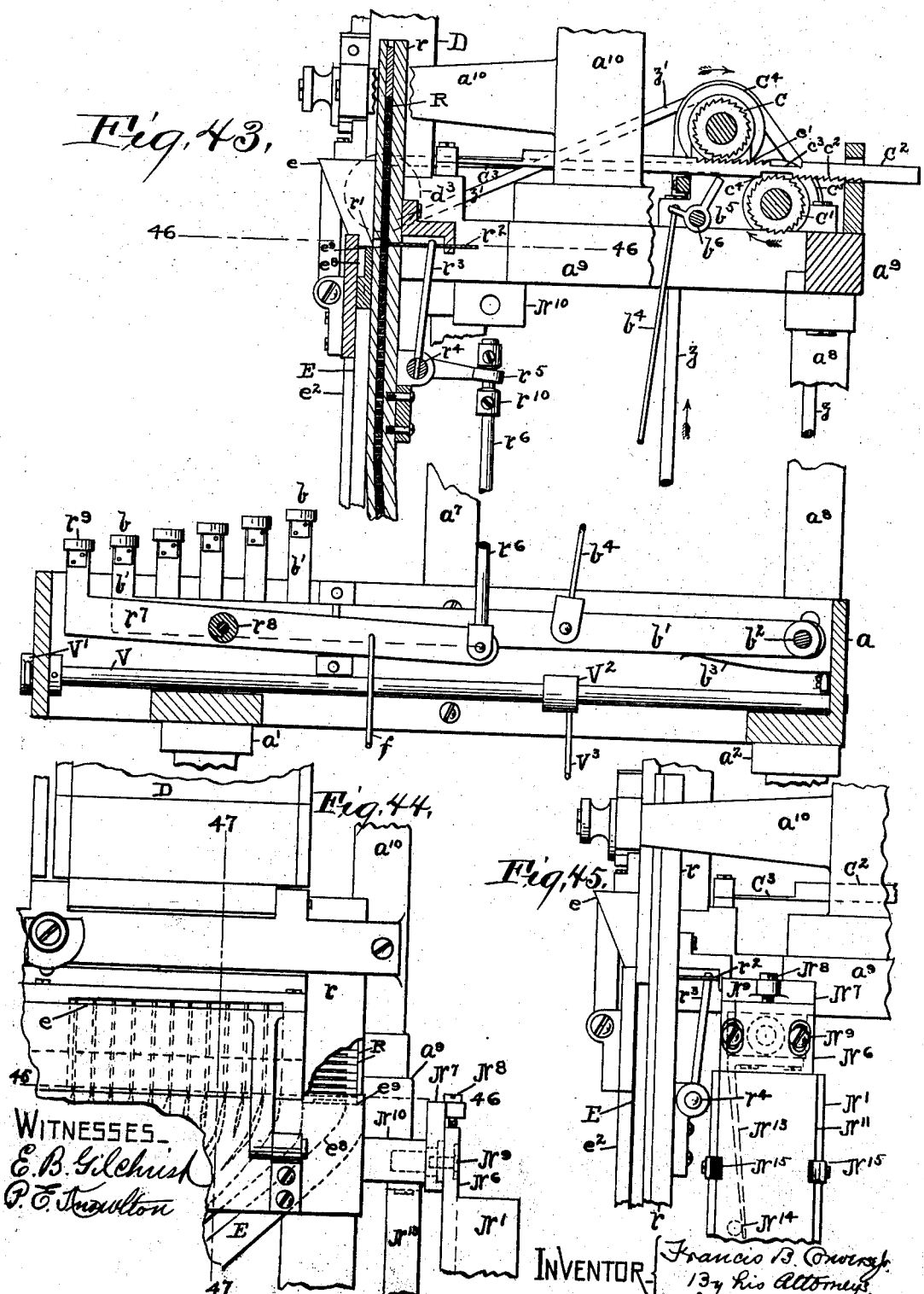

No. 717,169.　　　　　　　　　　　　　　　　Patented Dec. 30, 1902.
F. B. CONVERSE, Jr.
TYPE SETTING AND JUSTIFYING MACHINE.
(Application filed Dec. 19, 1898.)
(No Model.)　　　　　　　　　　　　　　　　18 Sheets—Sheet 18.
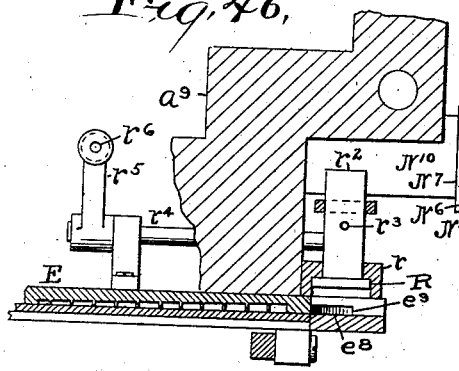
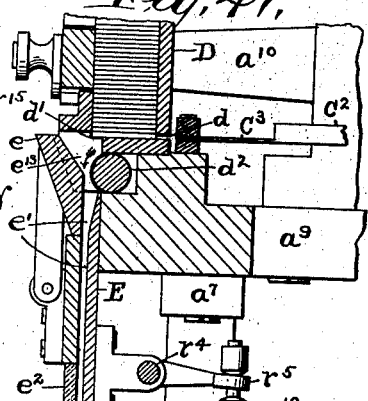
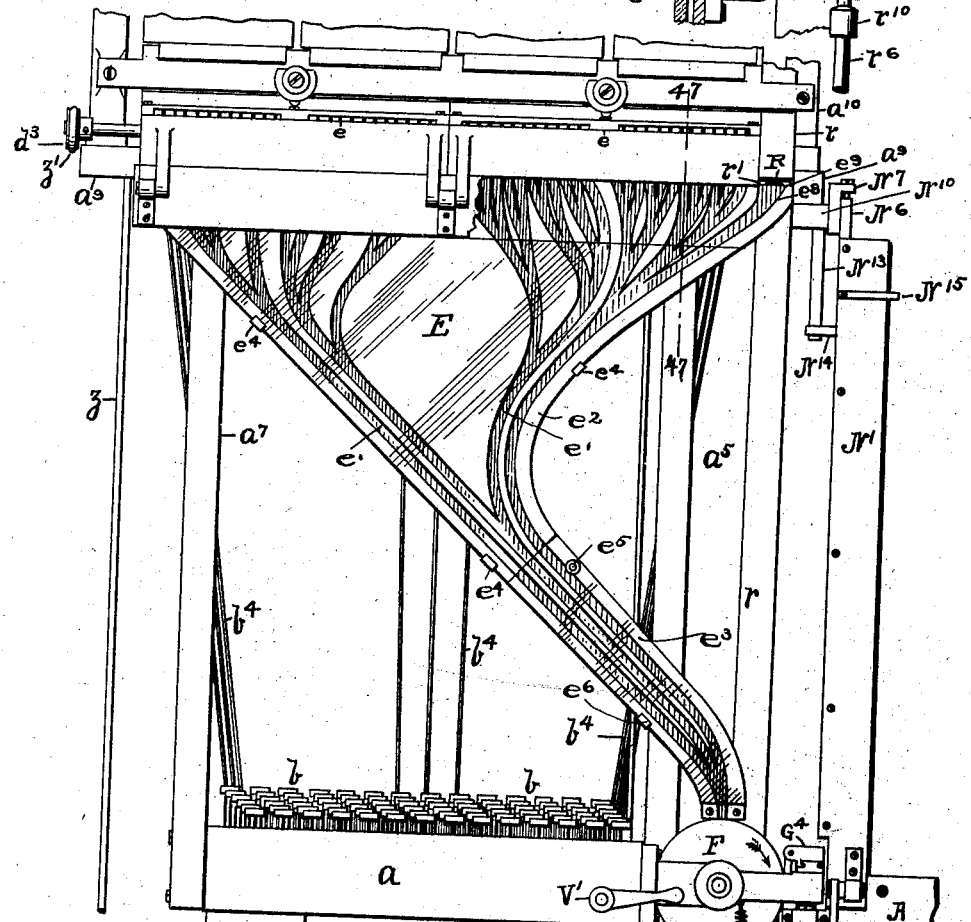
WITNESSES.
E. B. Gilchrist
Philip E. Knowlton
INVENTOR.
Francis B. Converse, Jr.
By his Attorneys,
Thurston & Bates.

UNITED STATES PATENT OFFICE.

FRANCIS B. CONVERSE, JR., OF LOUISVILLE, KENTUCKY, ASSIGNOR TO THE CONVERSE MANUFACTURING COMPANY, OF CLEVELAND, OHIO, A CORPORATION OF OHIO.

TYPE SETTING AND JUSTIFYING MACHINE.

SPECIFICATION forming part of Letters Patent No. 717,169, dated December 30, 1902.

Application filed December 19, 1898. Serial No. 699,697. (No model.)

*To all whom it may concern:*

Be it known that I, FRANCIS B. CONVERSE, Jr., a citizen of the United States, residing at Louisville, in the county of Jefferson and State of Kentucky, have invented a certain new and useful Improvement in Type Setting and Justifying Machines, of which the following is a full, clear, and exact description, reference being had to the accompanying drawings.

My invention relates to a machine for setting and justifying type, (either cameo or matrix,) and more particularly to that class of such machines which, actuated by a keyboard, set desired characters in line with temporary spaces between the words and after the line is set replace the temporary spaces by permanent spaces of the size required for proper justification of the line.

The object of the invention is to supply a machine of this character which shall be simple and efficient in operation, not liable to get out of order, and cheap to construct; and the invention consists of the combinations of mechanisms and the arrangement of parts which I employ for attaining this object. These combinations and arrangements are hereinafter described, and definitely pointed out in the claims.

Taken as a whole the invention may be described as including mechanism for setting type and temporary spaces, mechanism for taking account of the number of temporary spaces in the line, mechanism for measuring the space available for justification, a peculiarly-constructed selecting-block, mechanism connecting the selecting-block with the accounting mechanism, the measuring mechanism, and the permanent spaces, and mechanism for replacing temporary spaces by permanent spaces, whereby the proper sizes of permanent spaces to justify the line are caused to replace the temporary spaces in the line. Various subcombinations of these mechanisms and individual parts of the machine, however, are of my invention, and these can only be summarized as being illustrated in the following description and specified in the claims.

For ease of comprehension I will first give a general description of my machine without reference to drawings, premising that many modifications may be made and that neither such general description nor the specific description which follows it is to be taken as limiting the scope of my invention further than the claims and the prior art require.

The types with which the line is to be composed are placed on their flat sides in a series of cases which stand vertically in line across the upper part of the machine. Each case has an opening near its base at both the front and rear sides, and ejector-bars corresponding to the cases are set in operation by the actuation of the finger-keys and move into the rear openings of the corresponding cases, shoving the lowest type from the case through the forward opening. The type thereupon fall into converging chutes, where they are carried to a common point and are assembled one after another into a receiving-channel.

The temporary spaces are of a distinctive shape and are set between words in the line as it is being assembled. The space-key which operates to set these temporary spaces also actuates mechanism which keeps account of the number set. After the line has been assembled the length of space available for justification is measured. This is accomplished by measuring the distance between one end of the line and a gage which before any temporary space has been set stands from the other end of the line a distance just equal to the width of the desired column, but which as each temporary space is inserted is moved back from the end of the line a distance just equal to the thickness of the temporary space, thus eliminating the thickness as a factor in the measurement.

The mechanism which measures the available space acts to shift a peculiarly-shaped block, which I term the "selecting-block," in one direction, and the mechanism which has recorded the number of spaces inserted operates to shift that block in another direction at right angles to the former. This block is constructed of a series of stepped strips. Each strip is of individual dimensions, and thus designed to be operative with lines containing a particular number of temporary spaces, there being as many strips as the maximum number of spaces in any line the machine is designed to justify, and the movement of the block by the space-recording mechanism being from one strip to the next for each space inserted. The steps on each strip correspond in number to the number of different sizes of spaces which the machine is adapted to insert, and the length of the steps on the successive strips increases by a common arithmetical difference.

The permanent spaces are arranged in the order of their thickness in a case connected with a plunger, which is adapted to operate upon the different steps of the selecting-block. The position into which the block is brought by the space-recording mechanism shifting it laterally and the measuring mechanism shifting it longitudinally is such that the plunger of the space-case moving into contact with whatever step of the block is immediately in its path moves the space-case such distance as brings the proper-sized space in that case into active position. The line being advanced along the justifying-channel, it is stopped with its first temporary space opposite the space at the ejection-point, this stoppage being caused by a suitable detent brought into action by the characteristic shape of the temporary space. Mechanism then brought into operation shoves the permanent space from the space-case into the line, displacing the temporary space. The line is then advanced automatically until the next temporary space causes the line to stop. After the insertion of each permanent space the selecting-block is advanced in the direction of the length of the strips a definite amount, which is the common arithmetical difference between the length of the steps of successive strips. If the plunger stood in such relation to the corner of the step that these successive advancements cause that step to pass from under the plunger, then the plunger will move into engagement with the next step and the space-case will be shifted to bring the next size of space into the active position, the remaining permanent spaces inserted being of this size. On the other hand, if the plunger did not stand close enough to the corner of the step to thus pass off in virtue of the successive advancements of the selecting-block the succeeding spaces inserted will be of the same size as the first. These operations of substituting a permanent space, advancing the line, and advancing the selecting-block after each space is inserted are continued until a permanent space has been substituted for each of the temporary spaces in the line. After the permanent spaces have been substituted for all the temporary spaces in the line the justified line is delivered to the galley and the parts return to their normal position.

The operation is substantially the same whether ordinary printers' type or matrices are set.

I will now give a specific description of my invention as shown in the accompanying drawings, which illustrate its embodiment in a machine for the composition of ordinary printing-type.

Figure 1 is a perspective view of the machine complete, showing the front and right-hand end thereof, the point of view being at the right of the operator and the figure being on about one-fourth the general scale of the drawings. The justifying mechanism is comprised between the lower end of the race-plate and the bed, and except where otherwise specified the following views are of this part of the machine and are drawn to one scale. Fig. 2 is a front elevation showing the justifying mechanism and a portion of the keyboard. Fig. 3 is an elevation from the right-hand end of the machine. Fig. 4 is a rear elevation. Fig. 5 is a sectional end elevation from the left end, this section for convenience being on three vertical planes, which are indicated by the offset lines 5 5 in Figs. 2 and 4, the upper right-hand portion of the figure being somewhat behind the plane through the two lower shafts and the upper left-hand portion being somewhat in front of that plane. Fig. 6 is a vertical section parallel with Fig. 4, but near the front of the machine and looking from the rear, being on the offset line 6 6 of Fig. 5. Fig. 7 is a similar view on the line 7 7 of Fig. 5. Fig. 8 is a vertical section on the line 8 8 of Fig. 2 looking toward the right of that figure. Fig. 9 is a plan, being a horizontal section on the line 9 9 of Fig. 2. Fig. 10 is a horizontal section on the line 10 10 of Fig. 2 passing through the center of the upper shaft of the machine. Fig. 11 is a horizontal section on the line 11 11 of Fig. 2 passing through the lower shaft. Fig. 12 is an end elevation of the space-recording mechanism looking from the left end of the machine, the same being shown in horizontal section in Fig. 11. Fig. 13 is a vertical section on line 13 13 of Fig. 11 looking toward the front of the machine. Fig. 14 is a vertical section on the line 14 14 of Figs. 5 and 11 looking toward the front of the machine, the selecting-block being removed. Fig. 15 is a horizontal section looking downward on the line 15 15 of Fig. 14. Figs. 16 and 17 are vertical sections on the line 16 16 of Fig. 15 and show in side elevation the screw for shifting the block and its coöperating parts respectively out of and in engagement with the screw. Fig. 18 is a horizontal section on line 18 18 of Fig. 2 passing through the justifying-channel. Fig. 19 is a horizontal section on line 19 19 of Figs. 4 and 7. Figs. 20 to 28, inclusive, are details, on twice the scale of the preceding figures, of various parts of the machine. Fig. 29 is a perspective view, on a similarly large scale, of a temporary space. Fig. 30 is a vertical section on the line 30 30 of Figs. 5 and 9 looking from the rear of the machine. Figs. 31 to 34, inclusive, are sectional elevations of the space-recording mechanism, these views being taken with the mechanism in different positions. Fig. 35 is a horizontal section on the line 35 35 of Fig. 34. Figs. 36 to 41, inclusive, are views on twice the general scale and relate to the selecting-block, Fig. 36 being a side elevation thereof, Fig. 37 an end view, Fig. 38 a side elevation from the other side, Fig. 39 a plan, Fig. 40 a perspective view, and Fig. 41 a diagrammatic view, showing the side elevation of the strips of the block separately in order. Fig. 42 is a vertical section on the line 42 42 of Fig. 5 looking from the front, showing the assemblage and transfer member. The remaining figures relate to the setter. Fig. 43 is a sectional side elevation of the setting mechanism and the keyboard, the members connecting the two being broken away. Fig. 44 is a front elevation of the parts near the upper right-hand corner of the race-plate. Fig. 45 is a side elevation of the same portion. Fig. 46 is a horizontal section of the same, being on the line 46 46 of Fig. 43. Fig. 47 is a vertical section on the line 47 47 of Fig. 44. Fig. 48 is a view on a scale one-half the preceding, showing a front elevation of the race-plate and its coöperating parts.

I will now describe the machine shown in the drawings by reference-letters, and for greater convenience of reference I will first give the general classification of those letters, the same reference-letter, whether large or small and with various exponents, being used for the parts which coöperate to produce the same result.

A relates to the various parts of the frame of the machine; B, the keyboard, key-levers, &c.; C, the mechanism for ejecting the type; D, the type-cases; E, the race-plate; F, the assemblage and transfer member and the mechanism for eliminating the width of the temporary space; G, the justifying-channel and mechanism for advancing the type along the same; H, the measuring-wedge and its operating parts; J, the selecting-block; K, the plate on which the selecting-block rides and its coöperating parts; L, the screw for advancing the selecting-block for each space substituted and its operating mechanism; M, the space-recording mechanism; N, the space-case and connected parts; P, the word-shaft trip; Q, the space-ejector and its operating mechanism; R, the temporary space, its case, and moving mechanism; S, the space-turner and bar for operating it; T, the delivering mechanism; U, the leading mechanism; V, the main driving-shafts, their clutches, and gears; Z, the power distribution.

*Frame.*—A represents the bed of the machine, which is shown as supported on suitable legs. This bed carries the box-like frame A' of the justifying mechanism. Rising vertically from this bed also are four standards $a'$ $a^2$ $a^3$ $a^4$, at the upper end of which is secured the frame $a$ of the keyboard. Extending upward from the sides of the keyboard are four standards $a^5$ $a^6$ $a^7$ $a^8$, on the upper ends of which is the horizontal frame $a^9$ of the type-ejecting mechanism. From this horizontal frame rise the vertical standards $a^{10}$, from which arms project forward and carry the type-cases D, as shown in Fig. 1.

*Setting type.*—The setting mechanism is shown more particularly in Figs. 1, 9, and 43 to 48, inclusive. The finger-keys $b$, by which the setting operations are controlled, are mounted on the upturned ends of a system of levers $b'$, which are pivoted at their rear ends by a bar $b^2$, extending across the frame $a$ of the keyboard. Suitable springs $b^3$ operate to keep these levers normally elevated. Secured to these levers by a strap or other suitable means are the wires $b^4$, each of which is connected at its upper end to one arm of a bell-crank $b^5$, there being one bell-crank for each of the character-levers and all the bell-cranks being journaled side by side on a rod $b^6$, which extends across and is supported by the frame of the setter.

Carried in suitable bearings on the setter-frame $a^9$ and extending across the same at different elevations are the toothed cylinders C and C', and between them, as shown in Fig. 43, are a set of ejector-bars $C^2$, these bars being arranged side by side across the setter-frame and there being one bar above each bell-crank $b^5$ and being adapted to be raised by it into engagement with the toothed cylinder C. There are teeth $c'$ on the upper side of each ejector-bar adapted to engage with the cylinder C when the bar is elevated, and teeth $c^2$ on the lower side of the bar, which may engage with the roller C'. A notch $c^3$ is formed in the upper side of the ejector-bar just at the rear of the teeth $c'$ and another notch $c^4$ on the under side at the front of the teeth $c^2$. If now a key-lever is depressed, the wire $b^4$ is drawn downward, and the upper end of the bell-crank $b^5$ is swung forward and raises the ejector-bar above it into engagement with the toothed cylinder C. This cylinder and the cylinder C' are revolved continuously in the direction indicated by the arrows by means of the belt $z$, whereby the bar $C^2$ is shoved forward until the notch $c^4$ on its under side comes over the bell-crank, whereupon the bar drops out of engagement with the cylinder C, (the notch $c^3$ facilitating its release,) and its lower teeth $c^2$ pass into engagement with the cylinder C', which carries the bar rearward until the notch $c^4$ comes over the cylinder C', whereupon the ejector-bar stops. Thus for each depression of a key-lever the corresponding ejector-bar moves forward and then returns to its normal position.

Extending across the frame of the setter side by side and parallel with the front of the machine are the type-cases D. These cases are divided into parallel vertical channels, each of which contains type of a certain character. There is an opening $d$ at the rear of the base of each channel and an opening $d'$ at the front thereof. Through the opening $d$ the reduced end $C^3$ of the ejector-bar $C^2$ is adapted to enter and shove the lowest type in the case out through the opening $d'$, so that its face end takes onto a ledge $e$, extending across the machine, and its foot drops onto a continuously-revolving roller $d^2$, and thence passes into a channel $e'$, which is formed in the race-plate E. This race-plate contains converging channels for all the types from the points of ejection to the point of assemblage. Thus when any character-key is depressed the type corresponding to it is ejected and passes down the race-plate to the common point of assemblage beneath the race-plate, as hereinafter mentioned.

This setting mechanism is substantially the same as that shown in my Patent No. 601,706, granted to me April 5, 1898, and will not be further elaborated herein. In that patent, however, the type-cases and race-plate extend at right angles to the keyboard. I have found, however, that by forming a race-plate of the shape shown in Figs. 1 and 48 I can place the plate and type-cases parallel with the front of the machine and have the type travel from their different points of ejection to a common assemblage-point at one side of the keyboard in substantially equal times from all the points of ejection. This allows the line to be set up in better view of the operator and is otherwise more convenient than where the race-plate is at right angles to the front of the machine or than would be the case if it discharged centrally back of the keys. The race-plate is covered by two plates of glass, $e^2$ $e^3$, the upper of which is removably held in place by the clips $e^4$ and the lower of which is pivoted to the race-plate by the pivot $e^5$ and is otherwise held in place by the clip $e^6$. Access is thus given to the channels for the purpose of cleaning them or otherwise, the lower plate being conveniently swung upward on its pivot $e^5$ should type clog at the foot of the race-plate by reason of two keys being struck at the same time. As the type arrive at the bottom of the race-plate their feet are received by the wiper-wheel $e^7$, Fig. 5, which is continuously rotated in a direction forward and downward. This results in the type being shoved forward against a follower $F^2$, carried in an assemblage-channel $F'$. There are four of these channels, ninety degrees apart, formed by two parallel wings $F^3$, also Fig. 42, extending from a central body F, the uppermost channel being the one in which the type is thus assembled. This channel member F during the operation above described remains stationary; but it is intermittently revolved, as hereinafter explained, to transfer the line to the justifier. Therefore I refer to it either as the "assemblage" member or the "transfer" member.

The operation of setting above described has reference to the character-type.

*Setting temporary spaces.*—The temporary spaces R are of the same body as an ordinary type, but have a characteristic shape, the spaces employed herein having a notch R' on one side, as shown in Fig. 29. These temporary spaces lie with their notches downward in a case $r$, Figs. 1, 7, and 43 to 48, which extends in a substantially vertical direction from a point at the rear of the assemblage-channel to the setter-frame $a^9$ and is attached to the back side of the upper corner of the race-plate, and at this point orifices are formed in its front and rear sides. As the temporary spaces thus lie parallel with the race-plate it is only necessary to eject them a short distance in order to allow them to pass down the race-plate. They are ejected by means of a flat plunger $r^2$, which is advanced behind the temporary space, which is opposite the orifice $r'$, by means of a rock-lever $r^3$, extending from a shaft $r^4$, which is turned by a lever $r^5$, operated by a rod $r^6$, secured to the rear end of the space-key lever $r^7$. This lever is pivoted at $r^8$, between its ends, to the frame of the keyboard $a$, and when its key $r^9$ is depressed the rod $r^6$ is elevated and the adjustable collar $r^{10}$ thereon raises the lever $r^5$, and thus shoves the plunger $r^2$ forward, ejecting the temporary space that is in front of it. This space passes over the mouth of the channel $e^8$ in the race-plate, one end of the space lying on the ledge $e^9$, formed at one side of that channel, whereupon as the space falls down the channel one end swings downward around the corner of the channel as a center, and thereafter the space passes down the race-plate as an ordinary type and is assembled in the assemblage-channel in the same manner as a character-type, with its notch toward the right-hand end of the machine.

The depression of the space-key initiates two other operations besides setting the temporary space, namely: It moves back the end of the assemblage-channel from which the amount of available space for justification is measured a distance equal to the thickness of the temporary space, thus eliminating this thickness from the measurement. I therefore call this the "eliminating" mechanism. It also causes account to be kept of the number of temporary spaces inserted, which account operates at the proper time to shift the selecting-block. The description of this latter mechanism, which from its functions I call the "space-recording" mechanism, will be deferred, as it can more easily be understood after the selecting-block has been described.

*Mechanism for eliminating thickness of temporary spaces from measurement of line.*—Referring more particularly to Figs. 6, 7, 11, 12, and 31 to 35, inclusive, depending from the space-key lever $r^7$ at the rear of its pivot is the wire $f$, the lower end of which is connected to the bell-crank lever $f'$, pivoted to the bracket $f^2$, supported by the bed-plate. To the upper arm of this bell-crank is pivoted the pawl $f^3$ of the same shape as and directly behind the pawl $f^4$ in Figs. 31 to 34. This pawl $f^3$ is normally pressed upward by a spring $f^5$, carried by the bell-crank, and carries on its upper side a tooth $f^6$, which is thus caused to engage with the teeth of a ratchet $f^7$, which is keyed to a shaft $f^8$, journaled in bearings in the bracket $f^2$. The other pawl, $f^4$, similar in construction to the pawl $f^3$, is pivoted to the bracket $f^2$ and normally elevated by a spring $f^9$. The result of this construction is that when the space-key is depressed the wire $f$ is drawn upward and the pawl $f^3$ rotates the shaft $f^8$ the distance of one tooth of the ratchet. When the pressure is removed from the space-key, the pawl $f^4$ retains the ratchet in place, and the pawl $f^3$ in returning to its normal position takes over onto the next tooth of the ratchet in position to again move it. Keyed to the shaft $f^8$, near the other end, is the gear $f^{10}$, which meshes with a suitably-guided rack $f^{11}$. This rack is prolonged into the bar $f^{12}$, the upper end of which is secured to the plate $f^{13}$, Fig. 5, which reciprocates in suitable guides $f^{14}$. In this plate is a diagonal slot $f^{15}$, preferably made in the step form shown, and into this slot takes a pin $f^{16}$, projecting from a bar $f^{17}$, which is adapted to reciprocate crosswise of the plate in suitable bearings formed in the guides $f^{14}$. To the forward end of this bar is adjustably and rotatably secured the shaft $f^{18}$, which extends into the member F along its axial line. Rigidly secured to the forward end of this shaft is a larger shaft $f^{19}$, (made larger to secure the desired stiffness,) having a sliding bearing in the member F. On the front end of the member F is a plate $F^4$, which is rigidly secured to the member and has a flange $F^5$, which forms a bearing for the forward end of the shaft $f^{19}$. A recess $F^6$ is formed in the member from the forward end thereof, and within this recess is a collar $f^{20}$ on the shaft $f^{19}$, against which is screwed a gage-piece $f^{21}$, (also Fig. 42,) which for convenience is made in the shape of a wheel. The spokes of this wheel extend through slots $F^7$ in the member, and the rim of the wheel extends through slots $F^8$ in the wings of the member, thus crossing the assemblage-channel. The portion of the rim of this wheel which is within the assemblage-channel operates to form the end of that channel, limiting the movement of the follower $F^2$ and forming a datum from which the measurement of the available space for justification is made.

It will be seen that by reason of the combination described each time the space-key is depressed the plate $f^{13}$ is drawn downward a sufficient distance to move the wheel $f^{21}$ away from the point of assemblage a distance just equal to the thickness of the temporary space which is inserted at the same time, since the horizontal distance between the vertical faces of the slot $f^{15}$ is just equal to the thickness of the temporary space and the radius of the gear $f^{10}$ is such that the plate $f^{13}$ is depressed each time just the vertical distance between the centers of successive vertical faces of the slot $f^{15}$. Thus whenever a temporary space is inserted the end of the assemblage-channel moves backward the same amount of space that is added to the line by the temporary space, and the distance between the follower $F^2$, which is against the foremost type, and the rim $f^{21}$ is thus the same it would have been if no temporary space had been inserted.

*Mechanism for transferring assembled line to justifier.*—Assuming now that a line of type and temporary spaces is set up in the assemblage-channel F, I will refer now more particularly to Figs. 2, 5, 6, 9, and 18, the two latter figures showing a line set up with temporary spaces at suitable intervals and the gage-rim $f^{21}$ set in the corresponding position. Suitably journaled in the keyboard-frame $a$ is a rock-shaft V, at the front end of which is secured a lever $V'$, which I call the "line-lever," and toward the rear end of the shaft is the arm $V^2$, which is connected by a wire $V^3$ with the lever $V^4$, which is pivoted on the bracket $f^2$. This lever $V^4$ operates normally to press against the tail $v^5$ of a pawl $v^4$, carried by a disk $v^3$, which is keyed to the lower main shaft $v^2$ of the machine. Free on this shaft $v^2$, between the disk $v^3$ and the bearing $v^{13}$, is the gear $v^7$, which is continuously revolved, as hereinafter explained. The hub $v^8$ of this gear extends to the disk $v^3$ and has at that end the notched disk $v^9$, which is adapted to be engaged by the nose of the pawl $v^4$, and thus with that pawl constitutes a clutch. Now when the line-lever $V'$ is depressed, as it is upon the completion of the assemblage of the line, the wire $V^3$ is drawn upward and the end of the lever $V^4$, which normally engages with the tail of the pawl, is drawn out of such engagement, and the spring $v^6$, acting on that tail, forces the pawl into engagement with the notched clutch member $v^9$, whereupon the disk $v^3$ is caused to rotate with the gear $v^7$, and this disk being keyed to the shaft $v^2$ the whole shaft rotates. When the operator's hand is removed from the line-lever, the spring $V^5$, Fig. 13, acting on the lever $V^4$, returns this lever to the position to engage the tail $v^5$ of the pawl $v^4$ and draw the pawl out of engagement with the clutch member $v^9$ as it returns to its initial position, wherefore the shaft $v^2$ makes just one complete rotation with each depression of the line-lever. This shaft $v^2$ I call the "line-shaft." Secured to the forward end of the line-shaft $v^2$ is the cam $F^9$, which operates upon the roller $F^{10}$, carried by the link $F^{11}$, guided at its lower end by a slot $F^{12}$, which embraces the line-shaft, and pivoted at its upper end to a disk $F^{13}$, which is journaled on the flange $F^5$ of the transferring member F. This disk carries a pawl $F^{14}$, which is pressed by a spring $F^{15}$ into engagement with a ratchet $F^{16}$, which is rigidly secured to the transferring member by the plate $F^4$. This ratchet has four teeth ninety degrees apart, and the throw of the cam $F^9$ is such that in its rotation it moves the disk $F^{13}$ ninety degrees, whereby the pawl $F^{14}$ rotates the transferring member ninety degrees, and thus brings the vertical assemblage-channel which contains the type and temporary spaces into a horizontal position, as shown in Fig. 18, the next assemblage-channel coming into the position which was just occupied by the one containing the type and being held against accidental displacement in this position by the spring-detent $F^{17}$. (Shown in Fig. 5.) The roller $F^{10}$ is kept in engagement with the cam $F^9$ by the spring $F^{18}$, secured at its lower end to the link $F^{11}$ and at its upper end to the bracket $F^{19}$, which is secured to the frame $a$ of the keyboard and furnishes the outer bearing for the transferring member, the flange $F^5$ being journaled in it. The inner bearing of the member F is in the bracket $F^{20}$, which is also secured to the frame $a$ and serves as a support for the lower end of the race-plate E.

Figure 1:
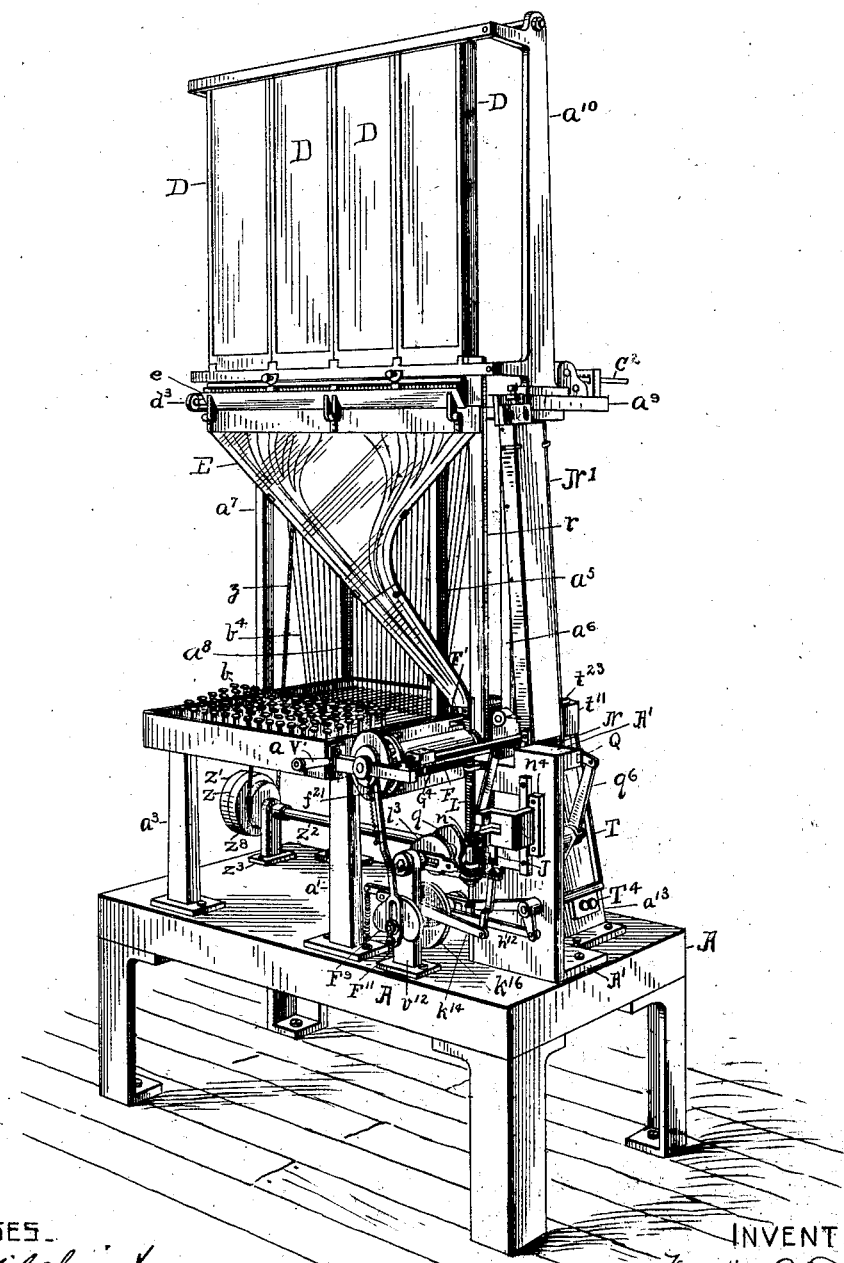
Figure 2:
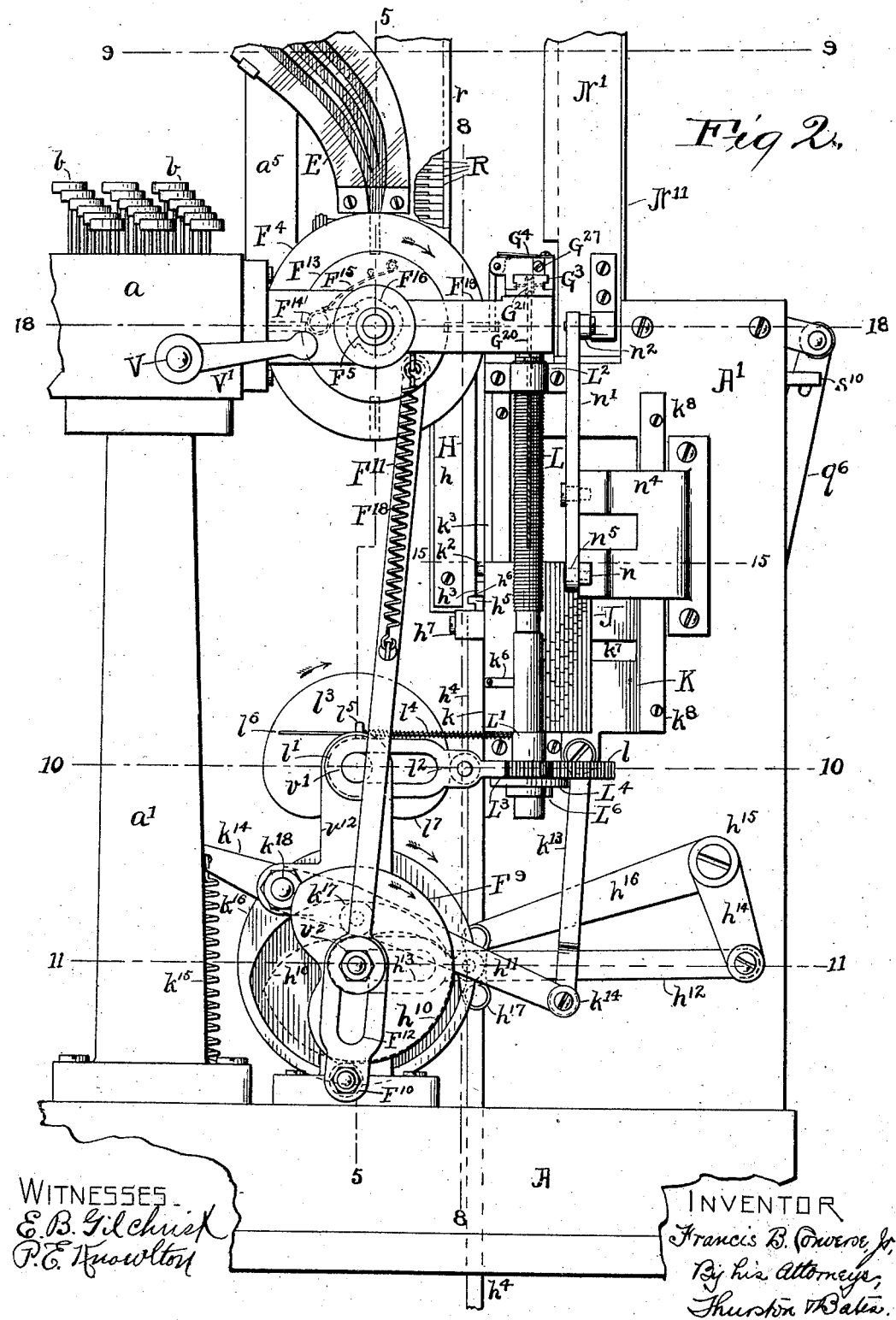
Fig. 2 shows the link in its extreme depressed position, the cam having rotated approximately a quarter of a revolution beyond the position of rest.

*Measuring mechanism.*—Any form of mechanism which is adapted to measure the space at the end of the line and cause the space-block to move a proportionate distance might accomplish the desired result. The mechanism I have shown, however, is believed to be the simplest which will accurately do this. It consists, essentially, of a wedge whose taper—*i. e.*, the ratio of its theoretic base and height—is the ratio which the common difference between the consecutive sizes of permanent spaces bears to the common difference of length of the steps of succeeding strips on the selecting-block, combined with mechanism for communicating motion to the selecting-block proportionate to the movement of the wedge. This mechanism is shown in the drawings most clearly in Figs. 2, 5, 8, 14, 15, and 18. The wedge is designated H. It has its bearings on the side of the frame A' which supports the main portions of the justifying mechanism, the web $a^{11}$ extending therefrom, and a guide $h$ secured to the web and having a rib $h'$ projecting into a groove $h^2$ in the wedge. The side of the wedge next to the frame A' does not itself contact with the frame, but carries at its lower end a horizontal strip $h^3$, which contacts with the frame. The upper end of the wedge is in a notch $G^{17}$ in the justifying-channel G. The inclined face of the wedge bears against the web $a^{11}$, the back of the notch $G^{17}$, and, as it rises, against the back of a notch $G^{18}$ in the plate $G^2$, forming the upper side of the justifying-channel. It will thus be seen that as the wedge is elevated it will be advanced toward the front of the machine and will pass into the notches $f^{24}$ in the wings $F^3$ of the assemblage member and will engage and shove forward the line of type until the follower $F^2$ impinges against the gage-rim $f^{21}$, whereby the wedge is stopped. The travel of the wedge is thus proportionate to the amount of space available in the line for justification—that is, it is proportionate to the amount of space which was between the follower and the gage-rim $f^{21}$. The wedge is elevated by means of the tooth-bar $h^4$, which slides in contact with the side of the frame A' and has bearings in the block $h^7$ beneath the wedge and in the bed-plate A. This bar $h^4$ has on its upper end a tongue $h^5$, taking into a horizontal groove $h^6$ in the wedge. The teeth on this bar mesh with the teeth of the gear-wheel $h^8$, which is pivoted on a stud $h^{18}$ on the frame A' and is given a tendency by the spring $h^9$ to revolve upward on its forward side, and thereby elevate the bar. This spring, however, is only allowed to act when the cam $h^{10}$, which is operating to hold the bar down, releases it. This cam $h^{10}$ is secured to the line-shaft $v^2$. It coacts with a roller $h^{11}$ on a link $h^{12}$, one end of which link bears on the shaft $v^2$ by means of the yoke $h^{13}$, and the other end of which is secured to the short arm $h^{14}$ of a bell-crank lever, which is pivoted at $h^{15}$ to the front of the frame A'. The other arm $h^{16}$ of this bell-crank lever is connected by a link $h^{17}$ with the bar $h^4$. The cam $h^{10}$ is concentric for about one-half of its circumference—that is, about a quadrant in each direction from its position of rest. It is shown in Figs. 2 and 14 after it has moved about a quarter of a rotation and is just on the point of releasing the roller $h^{11}$. It will be seen that the next quarter-rotation (or less) of this cam will allow the roller to move toward the shaft $v^2$, and thus the spring $h^9$ is allowed to unwind and elevate the bar $h^4$ and the wedge, coming to rest when the type and follower $F^2$ have been compacted between the wedge and the gage-rim $f^{21}$. The amount of movement which the wedge has thus taken determines the amount of longitudinal movement of the selecting-block in a manner to be hereinafter explained. After the wedge and bar, and hence the link $h^{12}$ and the roller $h^{11}$, have thus come to rest the cam $h^{10}$ continues to rotate idly until its increasing face contacts with the roller and forces the same forward, drawing down the bar $h^4$ and the wedge H to their initial positions.

Figure 40:
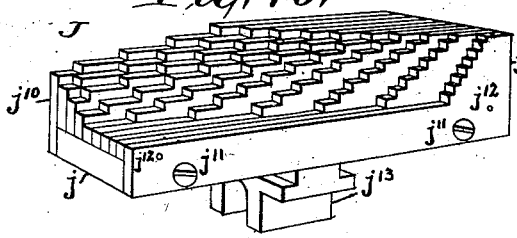
Figure 42:
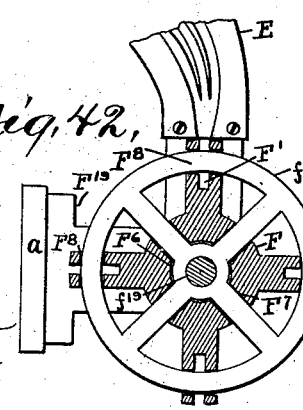

*The selecting-block.*—The block, Fig. 40, for selecting the permanent spaces (herein called the "selecting-block") is, as hereinbefore outlined, shifted lengthwise a distance proportionate to the available space for justification in the line of type and crosswise a distance proportionate to the number of spaces in the line. A plunger connected with the space-case engages with a step of the block dependent on the position of the latter, and thereby brings the space-case into position to cause the selection of the desired size of permanent spaces. The block is shown in connection with the rest of the machine in Figs. 2, 3, and 15 and in detail in Figs. 36 to 41, inclusive. It is made up of a base $j$ to which are secured as many stepped strips $j'$ to $j^{10}$, inclusive, as the maximum number of spaces in any line the machine is constructed to justify—in this case ten. For convenience of construction the two outside strips $j'$ and $j^{10}$ are attached to the edges of the base $j$ by means of the screws $j^{11}$, and the other eight strips are held in position between them and on the face of the base-plate by the pins $j^{12}$. On the other side of the base of the block is a yoke $j^{13}$, by which it is held in the machine and by which it is shifted laterally, as hereinafter explained.

The series of permanent spaces (called in the printers' art "spaces" and "quads") may be any series of sizes desired; but those provided in the present machine are nine in number, varying in thickness by .01 of an inch from the thinnest space of .03 of an inch to the thickest space of .11 of an inch. The measuring-wedge H is tapered in the present machine one inch in four, wherefore for every .01 of an inch shortness of the line—i. e, the common difference in the sizes of permanent spaces—the wedge rises .04 of an inch, and this fraction of .04 of an inch constitutes the "unit" on which the length of the steps of the selecting-block are constructed, this unit being the taper of the wedge times the common difference of the sizes of spaces.

The strips of the selecting-block are any convenient thickness, (all the strips being the same in this respect,) and the rises—i. e., the dimensions at right angles to the base—of all the steps on all the strips are the same. This rise is dependent upon the proportions of the connection between the plunger and the space-case, a movement of the plunger equal to the rise of a step moving the space-case the distance between the centers of adjacent channels. The strips differ from each other in the length of the dimension of their steps parallel with the base, which dimension I call the "tread." The treads of the steps of any one strip (with the exception of the top step) are the same, and the treads of the steps of the successive strips increase in arithmetical ratio.

By the term "series of steps" herein I do not mean to include every series of projections which happen to be placed in echelon, but only a series where the stepped surface is engaged to produce the result—in other words, a series where the stepped effect is produced by engageable faces, called "treads," which recede from each other in two directions, as upward and backward.

The corner of the first or top step on any strip is located a particular distance from a given datum line, and for convenience the high end of the block is made coincident with this line. This distance (and hence in the block shown the length of the top step) for any strip is as many units (.04 of an inch) as there are spaces to be inserted when that strip is in action plus such number multiplied by the thickness of the thinnest permanent space the block is designed to select, (stated in hundredths of an inch.) Thus the thickness of the thinnest permanent space being three-hundredths the top step on the strip for one space (first strip) is one, one by three, or four. The second strip $j^2$ has its top step two, two by three, or eight. The reason for this location of the corner of the top step is found in the following: As will be hereinafter more fully explained, the block is advanced in the same direction as its advancement by the measuring-wedge one unit after each permanent space is inserted, and thus when the thinnest size of permanent space is to be inserted throughout the line the plunger must stand at the beginning of the substitution as many units from the corner of the step as there are spaces to be inserted, so that the plunger will remain on the top step throughout the operation of the insertion. Now the initial movement which the block receives from the wedge is as many units as the line is hundredths of an inch short, which equals (when the line is to be justified throughout by the thinnest permanent space) the thickness of the thinnest spaces in hundredths of an inch multiplied by the number of those spaces to be inserted. Thus the initial movement of the block is a number of units equal to the number of the strip (counting from the strip for one space) times the number of hundredths of an inch in the thinnest permanent space, and to this product must be added to give the corner of the top step the number of units the plunger may be required to stand on the top step, which, as stated, is the number of that strip.

The following table gives the length of the top step and of the treads of the other steps in each strip: first strip, top step four units long, other steps one unit long; second strip, top step eight units long, other steps two units long; third strip, top step twelve units long, other steps three units long; fourth strip, top step sixteen units long, other steps four units long; fifth strip, top step twenty units long, other steps five units long; sixth strip, top step twenty-four units long, other steps six units long; seventh strip, top step twenty-eight units long, other steps seven units long; eighth strip, top step thirty-two units long, other steps eight units long; ninth strip, top step thirty-six units long, other steps nine units long; tenth strip, top step forty units long, other steps ten units long.

Figure 3:
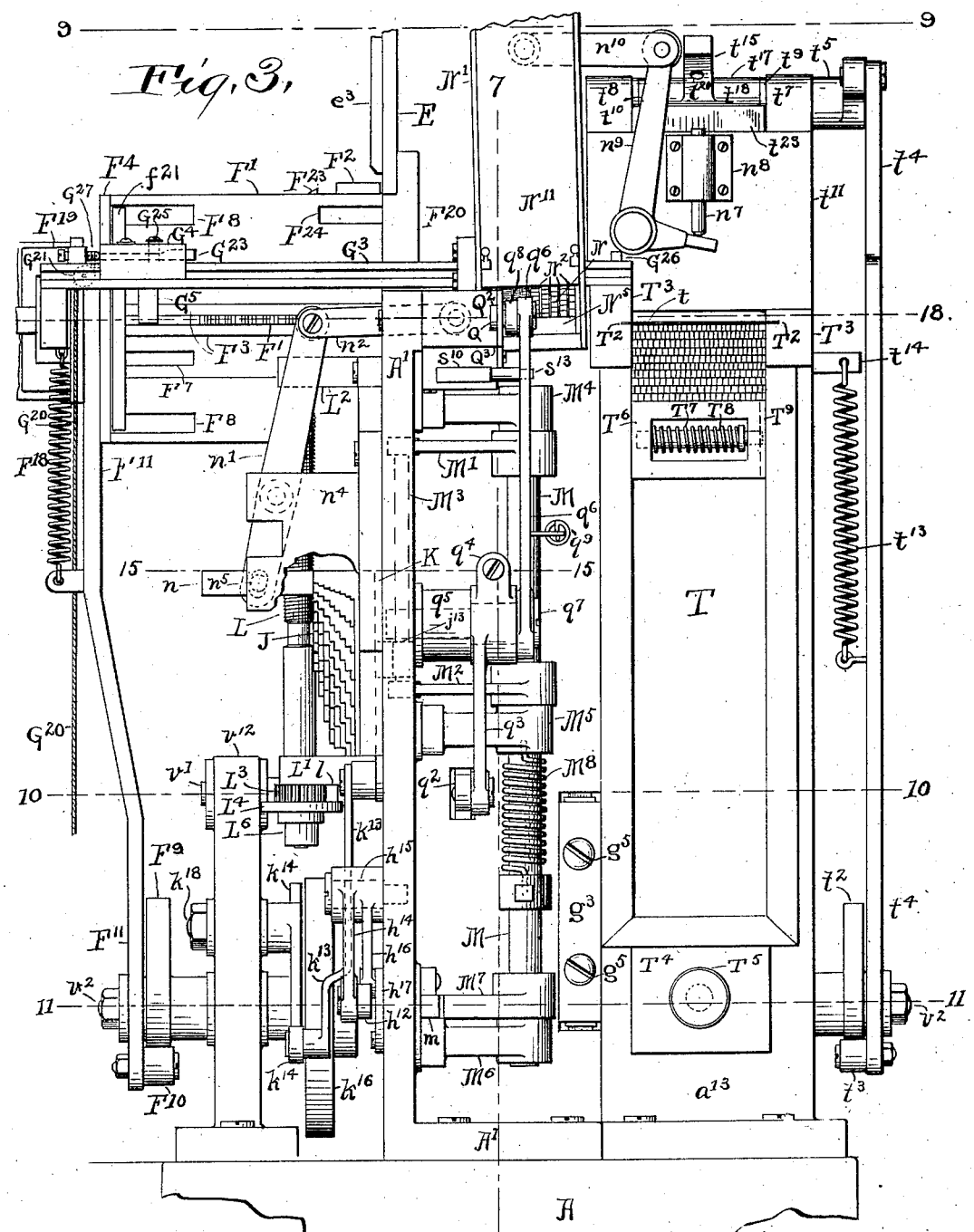
Figure 41:
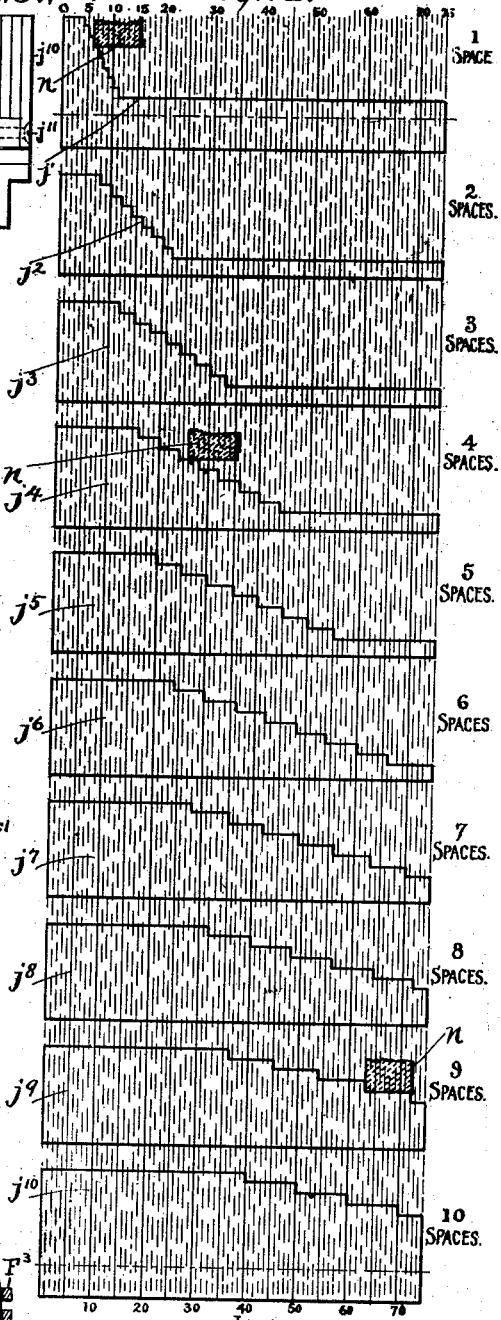
Figure 38:
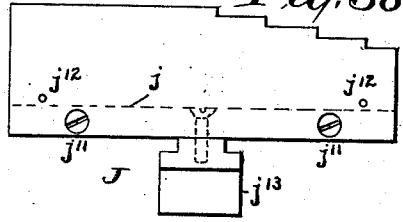
Figure 39:

I will give a few concrete examples of the operation of the selecting-block, premising that when the plunger $n$, Fig. 3, (connected with the space-case in a manner yet to be described,) is in engagement with the top step the thinnest permanent space is selected and when it is in engagement with the next step the next thicker space is selected, and so on, and premising also that after the insertion of each permanent space the selecting-block is advanced toward the left in Fig. 41 a distance equal to the unit, as above defined.

Suppose the line to be justified contains one temporary space and is .06 of an inch too short, (exclusive of the thickness of the temporary space, which, as hereinbefore explained, is eliminated from the calculation,) the measuring-wedge would operate to move the selecting-block six units from its datum position, this position being that shown in Fig. 3, where the upper end of the block is on a line with the upper edge of the plunger $n$. This six-unit movement of the block brings the fourth step directly beneath the plunger and the space-case will thus be shifted as the plunger descends onto this fourth step to cause the insertion of the fourth size of permanent space, which is .06 of an inch in thickness. This position of the plunger is indicated on the strip $j'$ in Fig. 41, where the vertical diagrammatic lines are one unit apart.

Suppose the assembled line contains four temporary spaces and is .26 of an inch too short. The fourth strip $j^4$ is brought under the plunger by the operation of the space-recording mechanism, to be hereinafter explained, and the measuring-wedge permits the block to move twenty-six units upward to the left in Fig. 41. Counting twenty-six units on the fourth strip $j^4$ the plunger is found to descend onto the fourth step with its edge two units from the edge of the step. The first permanent space inserted will therefore be of the fourth size, or .06 of an inch in thickness. After its insertion the block moves one unit to the left. The plunger is still on the fourth step, and the second permanent space inserted is thus .06 of an inch in thickness. After its insertion, the block moving one more unit to the left, the plunger will pass to the fifth step, causing the selection this time of a permanent space .07 of an inch thick. After its insertion the block moves another unit to the left, which leaves the plunger still on the fifth step and the fourth permanent space of .07 of an inch thickness is inserted. Thus two permanent spaces of .06 of an inch and two .07 of an inch have been substituted in the line for the temporary spaces, making a total of $2\times.06 + 2\times.07$ or $.12+.14$, or .26th of an inch, the required amount of space.

As a further illustration, suppose a line containing nine spaces is .63 of an inch too short. In this case the ninth strip $j^9$ will pass under the plunger sixty-three units, stopping so that the plunger will descend at the very beginning of the fifth step, as indicated in the diagram. In this position the left-hand edge of the plunger is the full length of the step from right-hand edge of the step—that is, nine units—wherefore each permanent space inserted will be of the fifth size, or .07 of an inch thick, and the nine permanent spaces will be nine times .07 of an inch, or .63 of an inch in the aggregate, the amount required for justification. As the last permanent space is inserted the plunger stands on the last unit of the ninth strip.

It will thus be seen that the spaces inserted in any one line may be of one size or of two sizes, but cannot be of more than two sizes, for if the plunger stands at the beginning of the operation of substituting permanent spaces at the extreme left end of a step it will stand on that step throughout, while if it stands at any other position than the extreme left end of a step it will move down during the process of substitution to the next step and will finally stand on that step in a position corresponding to the position it first occupied on the previous step, and thus after it has moved down onto the next step it must have on that step a relative movement less than the length thereof.

In order to shorten the block and the movement of its operating parts, the strips for the larger number of spaces in the line are not continued to the bottom step, this being unnecessary, since with a larger number of spaces to be filled the smaller sizes of permanent spaces will give as great an aggregate of space for justification as is necessary. Thus in the block shown in the drawings if six spaces or less are to be inserted in the line they may all be of any of the nine sizes of permanent spaces. If the line contains seven spaces, they may all be of any of the first seven sizes, or, as a maximum, two may be of the seventh size and five of the eighth size. Similarly if the line contains ten spaces these may all be of any of the first four sizes, or five of them may be of the fourth and five of the fifth size. This range given by the selecting-block herein shown has been found sufficient to justify any ordinary line of the width of the usual newspaper-column. If it is desired to use more than nine sizes of permanent spaces, the number of steps on each strip will be correspondingly increased. If it is desired to have the machine adapted to insert more than ten permanent spaces in the line, more strips will be added; and if it is desired to be able to insert any of the sizes which the machine carries in any line the length of the block will be increased to the length required to complete the steps of the last strip. Thus there is no limit to the number of sizes of permanent spaces which the machine may be constructed to insert or to the number of spaces in any line.

*The connection between the measuring mechanism and the selecting-block.*—Reference is now had more particularly to Figs. 2, 8, and 14 to 17, inclusive. Fixed to the wedge H, near its lower end, is a projecting strip $h^3$ (hereinbefore mentioned) at a right angle to the vertical edge of the wedge. This strip $h^3$ stands with its end normally under the pin $k^2$, which projects from the side of the block $k$ into the path of the strip as the wedge moves upward. This block slides on the vertical guide $k^3$. As the wedge rises the strip $h^3$ meeting the pin $k^2$ the block is raised with the wedge. Pivoted on the opposite side of the block at $k^4$ is the arm $k'$, carrying a section of a nut $k^5$, having threads cut in it to mesh with the threads of the screw L, but held normally out of engagement with said screw by the leaf-spring $k^5$. This screw L is carried in bearings at its upper and lower ends at $L^2 L'$. Below the lower bearing $L'$ is a gear $L^3$, attached to the disk $L^4$, which carries a pawl $L^5$, coöperating with a ratchet $L^6$, secured to the shaft of the screw. The gear has a cam connection designed to rotate the screw through the ratchet a half a rotation (one hundred and eighty degrees) at a time in a manner and for the purpose yet to be described. The threads of the screw L are of the ratchet form shown, having their under faces at right angles to the axis of the screw, so as to mesh positively with the corresponding upper faces of the threads of the nut $k^5$, which are also of the ratchet form. The screw is twelve and one-half pitch, cut double, so that from one convolution to the next is .04 of an inch—the same unit as that upon which the selecting-block is designed. Thus as the block $k$ is raised by the movement of the wedge the nut $k^5$ is carried upward along the screw L as many convolutions of the thread as the line is hundredths of an inch short. The yoke $j^{13}$ of the selecting-block projects through a horizontal slot $k^7$ in a plate K, vertically slidable on the front of the frame $A'$, being held thereto by the guides $k^8$ and $k^3$. Attached to this plate behind the arm $k'$ is the dog $k^9$, the upper end of which is inclined, as shown at $k^{10}$, and is adapted to engage with a lug $k^{11}$ on the back side of the arm $k'$, and thus force the nut $k^5$ into engagement with the threads of the screw. Attached to the plate K is the link $k^{13}$, connecting at its lower end with the lever $k^{14}$, pivoted at $k^{18}$ to the standard $v^{12}$. That end of this lever which is connected with the plate by the link $k^{13}$ is given a tendency upward by the spring $k^{15}$ pulling downward on the opposite end of the lever, while the amount of movement allowed the lever is governed by the inside cam $k^{16}$, into which takes a roller $k^{17}$ on the lever. Fig. 2 shows the parts in position after the cam has operated to draw the plate K downward to its extreme position.

The selecting-block stands after the completion of the justification of a line in the position in which it was last operative during that justification. When the line-lever is again depressed, the cam $k^{16}$ operates through the lever $k^{14}$ to draw the selecting-block to its lowest position, as shown in Fig. 2, while the assemblage member F is being rotated in the manner already described. Then as the wedge H rises in the operation of measuring the line just brought into position the cam $k^{16}$ permits the plates K and selecting-block to rise at the same rate with the wedge and just a little bit later, the wedge and selecting-block maintaining substantially their relative positions until the wedge comes to rest by compacting the assembled line of type. Then a short continued movement of the plate K causes the inclined face $k^{10}$ of the dog $k^9$ to engage with the lug $k^{11}$ on the back of the arm $k'$, and thus forces the nut $k^5$ into engagement with the screw L, the upper faces of the threads of the nut meshing with the next succeeding lower faces of the threads of the screw. As the nut engages with the screw the horizontal surface $k^{12}$ of the dog contacts with the under side of the lug $k^{11}$. This stops the plate K and with it the selecting-block in the exact position corresponding to the position of the wedge. Thereafter the cam $h^{10}$ operates, as hereinbefore explained, to draw down the wedge to its normal position, leaving the selecting-block in its elevated position, where it remains under the action of the spring $k^{15}$, the cam $k^{16}$ rotating idly thereafter to the end of one complete rotation.

*Space-recording mechanism.*—While the operation just described of shifting the block longitudinally was taking place the block was also shifted laterally to correspond with the number of spaces in the line by the space-recording mechanism, which I will now describe. This mechanism is shown in Figs. 3, 4, 7, 11, 12, 14, 15, and 31 to 35, inclusive. The yoke $j^{13}$, which connects the selecting-block with the plate K, extends through an opening $a^{12}$ in the frame $A'$ and yokes slidably around the rod $M^3$, carried by the arms $M' M^2$ on the shaft M, whereby the block may be raised or lowered independently of the rod, but must partake of the transverse movement of the rod. The vertical shaft M has bearings at $M^4$, $M^5$, and $M^6$ and carries at its lower end the segment of a gear $M^7$, which meshes into teeth cut in the face of the slidable link $m$. This link is acted upon by the cam $m'$ through the roller $m^2$, whereby as the increasing face $m^3$ of the cam passes the roller the block is moved toward the right in Figs. 14 and 15, the spring $M^8$ around the shaft M tending to return it toward the left as the decreasing face $m^4$ of the cam passes the roller. Attached at $m^5$ to the link $m$ is a strap $m^6$, preferably of metal, which passes around the hub $m^7$ of the disk $m^8$, being fastened thereto by the screw $m^9$. This disk is free on the shaft $f^3$. As the link $m$ is forced by the cam $m'$ to the left in Fig. 7, (right in Figs. 14 and 31 to 34, inclusive,) the disk $m^8$ is thereby rotated, its upper side turning toward the link. Another strap $m^{10}$, passing around the hub $m^7$ and secured by the screw $m^{11}$, carries a weight (not shown) below the bed of the machine, and thus tends to turn the disk in the opposite direction. The disk $m^8$ has on its periphery a series of steps $m^{12}$, arranged eccentrically, the radius of successive steps increasing arithmetically, there being one step to correspond to each strip in the selecting-block. The proportion of the hub $m^7$ and the connection between the link $m$ and the selecting-block are such that a movement of the link which moves the block the distance between the centers of successive strips rotates the disk this angular distance between the centers of successive steps.

It has already been shown that at each depression of the space-key the ratchet $f^7$ on the shaft $f^8$ is turned one tooth, thus keeping record of the number of temporary spaces in the line. Attached to this ratchet and turning with it is the wing $m^{13}$, carrying a pawl $m^{14}$, normally held in the position shown in Figs. 31 to 34, inclusive, by the spring $m^{16}$, which presses the pawl outward until its tail $m^{15}$ impinges against the pin $m^{17}$. The nose of this pawl projects beyond the wing, as at $m^{18}$, and is designed to engage the lug $m^{20}$ on the pawl $m^{19}$, carried by the disk $m^8$, the pawl $m^{19}$ being held in whatever position it was last left by friction with its pivot.

In Fig. 31 the ratchet $f^7$ is shown as having been turned one tooth. The pawl $m^{19}$ is out of engagement with a projection $m^{23}$ on the wing $m^{13}$, and the end $m^{29}$ of the link $m$ rests against the first step—that is, the step of the shortest radius—on the edge of the disk. This step corresponds to the strip for one space, each successive step corresponding to the successive strip. The disk $m^8$ is here shown in the position in which it was operative for the last preceding line of type, in which one permanent space was inserted.

As the space-key is depressed for successive temporary spaces inserted, the ratchet is rotated one tooth for each space and the wing $m^{18}$ moves toward the right in Figs. 31 to 34. Fig. 32 shows the position of the ratchet and wing after five temporary spaces have been inserted. This operation may proceed while the justification of the preceding line is taking place. If the line being now set contains just five temporary spaces, the line-lever will be depressed to start the operation upon this line, with the ratchet in the position shown in Fig. 32.

The depression of the line-lever initiates the rotation of the line-shaft $v^2$, which rotates the cam $m'$, and the increasing face $m^3$ of the latter engaging the roller $m^2$ moves the link to its extreme right-hand position. This shifts the selecting-block to its extreme position and also, through the medium of the strap $m^6$, rotates the disk $m^8$ to its extreme position, as shown in Fig. 14. The slack in the strap $m^6$ allows the end $m^{29}$ of the link to be out of the way of that projection $m^{27}$ which is on the step adjacent to the end of the link before the disk begins to rotate, and thus the link clears each of these projections as they rotate by it. As the maximum radius of the cam $m'$ coacts with the roller $m^2$, the selecting-block has reached its extreme position, which is slightly beyond the point in which it would come to rest for a line having ten temporary spaces. At the same time the disk $m^8$ has been rotated to its extreme position and the lug $m^{21}$ on the pawl $m^{19}$ engages with the overhanging stationary arm $m^{25}$, which moves the pawl inward, so that its nose $m^{22}$ is in position to engage the projection $m^{23}$ on the wing $m^{13}$, as shown in Fig. 14. When the decreasing face $m^4$ of the cam begins to act on the roller $m^2$, the link returns toward the left under the action of the spring $M^8$, Fig. 4. As the link returns the weight acting through the strap $m^{10}$ rotates the disk in the reverse direction until the pawl $m^{19}$ meets the projection $m^{23}$ on the wing $m^{13}$ and arrests further motion of the disk, as is shown in Fig. 33, this figure being taken at the moment that the disk comes to rest. The step which is now opposite the end $m^{29}$ of the link $m$ is the step corresponding to the number of spaces which have been inserted. As the link moves a little farther to the left under the action of the spring $M^8$ the end $m^{29}$ engages with this step, (the fifth,) and the link thus comes to rest, with the selecting-block in such position that its fifth strip is in position to be engaged by the plunger $n$. The projection $m^{27}$ on the step prevents the disk $m^8$ from rotating farther after the wing $m^{13}$ moves away from the pawl $m^{19}$ by reason of the pawls $f^3$ $f^4$ releasing the ratchet $f^7$. This release of the ratchet in order that the spaces in the succeeding line may be recorded while the preceding line is being justified takes place as follows: The pawls $f^3$ $f^4$ are extended to a point beneath the shaft $v^2$, where they are provided with heads $f^{25}$, designed to be acted upon by the projection $m^{28}$ on the hub of the cam $m'$. In the position of rest of the shaft $v^2$, Figs. 31 and 32, this projection is out of the path of the heads $f^{25}$; but as the cam is completing its rotation after the disk $m^8$ has come to rest, as shown in Fig. 33, the projection $m^{28}$ engages with the heads $f^{25}$ and depresses the pawls $f^3$ $f^4$ out of engagement with the ratchet $f^7$, whereupon a weight, (not shown,) which is attached to the strap $f^{26}$, Fig. 12, running off of the hub of the gear $f^{10}$, hereinbefore referred to, rotates this gear, and with it the shaft $f^8$ and the ratchet $f^7$, back to the starting-point, and the parts thus come into the position shown in Fig. 34, which is taken just before the springs $f^5$ and $f^9$ raise the pawls $f^3$ $f^4$ into engagement with the ratchet. This rotation of the shaft $f^8$ at the same time lifts the plate $f^{13}$, carrying the diagonal groove $f^{15}$, so as to bring the gage-rim $f^{21}$ to its initial position, as shown in Fig. 5. As the ratchet rotates in this reverse direction the pawl $m^{14}$ engages the lug $m^{20}$ on the pawl $m^{19}$ and moves the latter pawl out of the path of the projection $m^{23}$ on the wing $m^{13}$, so that if the next line contains more spaces than the line just operated upon this projection may pass the pawl $m^{19}$. The lug $m^{20}$ is offset from the rest of the pawl $m^{19}$, so that it may pass over the projection $m^{23}$ on the wing.

From the preceding description it will be seen that the selecting-block is left during the setting of a line in whatever position it was last operative, the ratchet recording the number of spaces in the succeeding line while the justification of the preceding line is going on and the parts being so timed that the justification of the line having the most spaces takes place in less time than the operator can set up the succeeding line.

Figure 7:
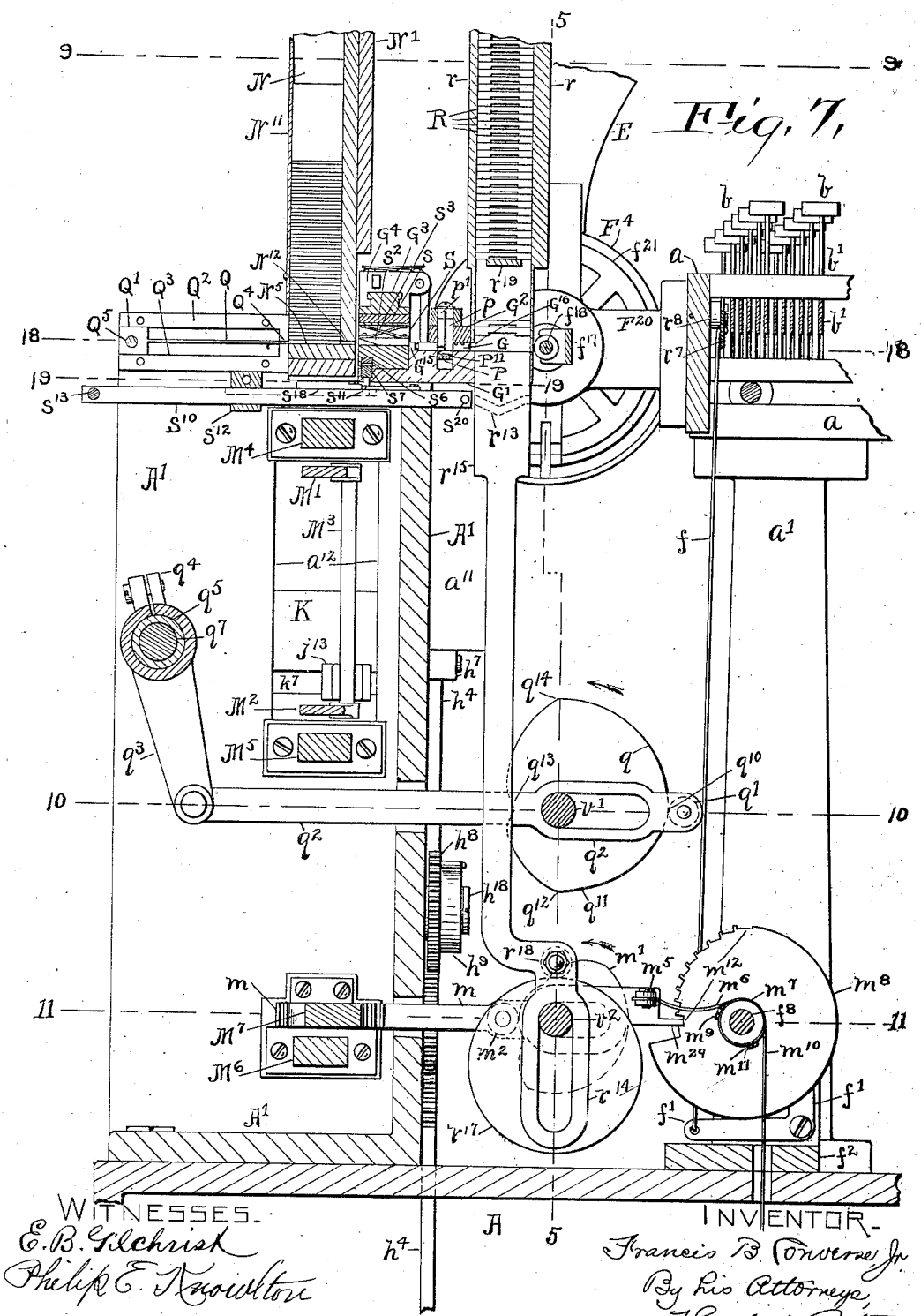

*Space-case and its connection with selecting-block.*—Referring now to Figs. 1, 2, 3, 9, 44, 45, and 48, the space-case consists of a long narrow box N, divided by longitudinal partitions $N^2$ into as many channels as there are sizes of permanent spaces. The channels are all of the same width—slightly larger than the body of the spaces—and the partitions are each of the same thickness. They are mortised into the back $N^3$ of the case. The case has a pair of sides $N^4$ and a bottom $N^5$, but is open at the upper end. It is removably contained within a box N′, composed of two sides, a back, and a bottom. This outer box is adjustably pivoted at its upper end to a portion of the frame of the setting mechanism. This pivoting and adjustment is shown best in Figs. 44 and 45. The back of the outer box is prolonged above the rest of the box, as at $N^6$, and is secured to a plate $N^7$ by means of the adjusting-screw $N^8$ and the two clamping-screws $N^9$, which latter pass through slots in the back $N^6$ into the plate $N^7$. This plate is pivoted to a block $N^{10}$, which is rigidly secured to the frame $a^9$ of the setting mechanism. The permanent spaces lie on their flat sides in the channels of the space-case. The thinnest spaces are in the channel nearest the front of the machine, the next thicker in the next channel, and so on successively. The front of the case is closed by a removable plate $N^{11}$, which insures the spaces being held in the case. This plate does not extend quite to the lower end of the case. Orifices $N^{12}$, Fig. 7, are provided through the opposite side or back of the case, and a space-ejector Q (the operation of which is to be hereinafter described) is adapted to enter the lowest portion of that channel which is just in front of it and shoves the bottom space therefrom through the orifice $N^{12}$. The space-case is adapted to be swung on its pivot to bring such lower end of any channel in front of the ejector, whereby the latter may eject a space from any channel. The space-case is of such length that the small arc through which its lower end swings is practically a straight line. This swinging of the space-case to allow the ejector to eject different sizes of spaces is governed by the connection between the space-case and the selecting-block heretofore referred to. This connection, Figs. 2 and 3, consists of a link $n^2$, pivoted at one end to the outer box N′ and at the other to a lever n′, which is pivoted intermediate of its ends to the bracket $n^4$, attached to the frame A′. At the other end of this lever is the "plunger," which term I use as being a convenient designation for the element, whatever its shape or path, which engages with the steps of the block. As shown, the plunger is a guided bar n, having a pin $n^3$, embraced by a slot in the lever n′.

This connection between the selecting-block and space-case is so proportioned that when the plunger rests on the highest step of any strip of the selecting-block the foremost channel of the space-case—that is, the channel containing the thinnest size of spaces—is in line with the ejector Q. As the plunger descends to each succeeding step the space-case is swung by a spring $N^{13}$, Figs. 45 and 48, secured to the block $N^{10}$ and bearing against a pin $N^{14}$ on the back of the box N′ to bring the succeeding space-channels into line with the ejector. When the plunger rests on the lowest portion of the selecting-block, the channel containing the largest size of permanent spaces is in line with the ejector.

During the operation which shifted the selecting-block to its operative position, as has hereinbefore been described, the space-case has been held (by means to be hereinafter described in connection with the delivery of the line) in its rearmost position, thus raising the end of the plunger away from the selecting-block and permitting the block to move freely. After the block has come to rest in its operative position the case is permitted to swing forward until stopped by the plunger coming against the step of the selecting-block in line with it, thus bringing the channel containing the size of permanent spaces first required into line with the ejector Q.

*Advancement of line until first temporary space is engaged.*—The operation of measuring the line and setting the selecting-block occupies but a portion of the rotation of the line-shaft $v^2$. After the wedge has returned to its normal position following the measurement of the line the continued rotation of the shaft $v^2$ operates to advance the line along the justifying-channel G in front of the space-case, the first temporary space in the line stopping directly in front of the point of ejection. This operation will now be described. It is illustrated most clearly in Figs. 2, 3, 5, 6, 8, 9, 18, 24, 25, and 30. The justifying-channel G extends from the rear end of the assemblage-channel F′ to the front edge of the galley T, being a groove G in the plate G′ of a width equal to the height of the type and of a depth equal to the body of the type. This groove G is covered over by a plate $G^2$. Extending parallel with the justifying-channel, above and to the right thereof, is the rail $G^3$, on which slides the reciprocating block $G^4$. This block is shown in perspective in Fig. 24 and in vertical section (along the side of the key $G^{23}$) in Fig. 25. It has depending from its edge nearest the type-channel a pivoted tongue $G^5$, normally held in a vertical position by the leaf-spring $G^6$, secured to the block and bearing at its free end on a lug $G^7$, projecting from the head of the tongue, as shown. This tongue when the block is in its normal position stands in front of the follower $F^2$ in the assembled line, which has just been revolved from the vertical to the horizontal position, Fig. 18, and the tongue is adapted to take into a notch $F^{22}$ in that follower by being advanced along the rail $G^3$, the edge of the follower being inclined, as shown at $F^{23}$, to force the tongue $G^5$ to the side and allow it to ride over into the notch $F^{22}$. The block $G^4$ is advanced along the rail $G^3$ by the cord $G^8$, Figs. 4, 5, 9, and 30, which is secured to it and passes over the sheaves $G^9$ $G^{10}$ $G^{11}$ and is secured at its other end to the strap $G^{12}$, which depends between the roller $g^2$ and the disk $v^3$ and the roller $g'$ and the disk $v^{15}$. These rollers are journaled in a bracket $g^3$, which is spring-pressed toward the disks by the springs $g^4$, surrounding studs $g^5$, which project from the frame $A'$ through holes in the bracket and have heads receiving the thrust of the springs. The arms of this bracket $g^3$, which carry the rollers, project, as shown, through openings in the frame $A'$, and the strap $G^{12}$ is guided in front of the rollers by the projecting ends $g^6$ of these arms. As shown, the disks $v^3$ and $v^{15}$ have portions of their periphery (designated $v^{16}$ and $v^{21}$, respectively) which are of greater radius than the rest. Immediately following the arrival of the wedge at its lowest position after measuring the shortness of the line this portion $v^{16}$ of the disk $v^3$ comes into coöperation with the roller $g^2$, thus gripping the strap between them and drawing the same downward. This downward pull on the strap draws the block $G^4$ along the rail and advances the follower and the type in front of it until the bar is stopped with the first temporary space at the point of ejection by mechanism thrown into operation by the peculiar shape of the temporary space, which operation will now be described. After such stoppage the disk slips idly past the strap for the remainder of the revolution.

Figure 8:
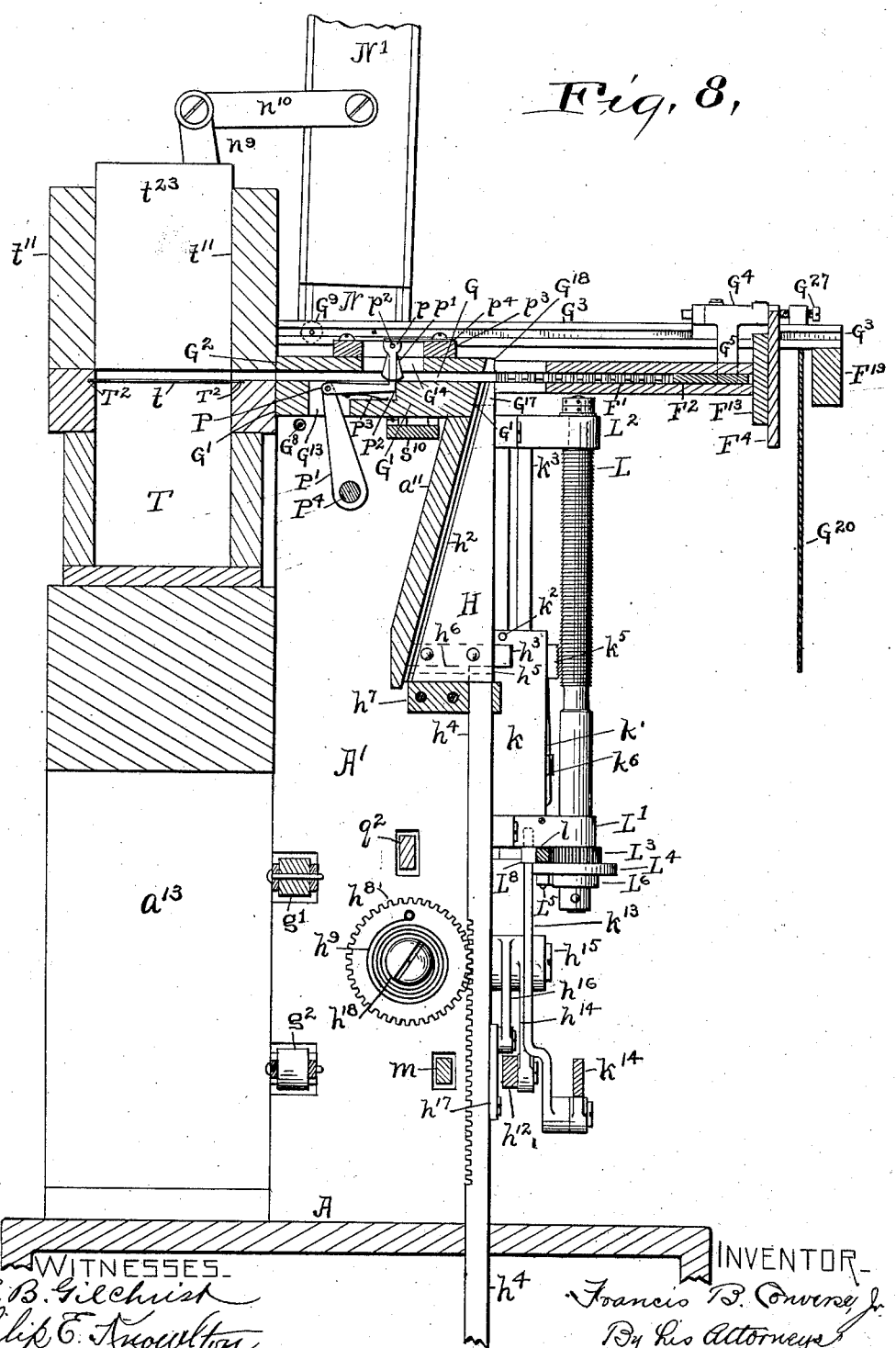

Contained within a recess $G^{13}$, Figs. 8, 18, and 30, in the plate $G'$ is the trip $P$, pivoted at one end to the lever $P'$ and having at the other end an upwardly-extending nose $P^2$ and carrying on its under side a spring $P^3$, which, acting against the bottom of the recess, tends to elevate the trip. The lever $P'$ is journaled on the stud $P^4$ and has its hub extended in the form of a sleeve $P^5$, which is adjustably clamped by the yoke $P^6$, formed at the end of the lever $P^7$, the levers $P'$ $P^7$ thus acting as one lever. The lower end of the lever $P^7$ is connected with the sliding plate $P^8$, which is normally drawn toward the rear of the machine by the spring $P^9$ and carries a depending tongue $P^{10}$, which in this position engages with the pawl $v^{17}$ on the disk $v^{15}$ and holds that pawl out of engagement with the notched clutch member $v^{18}$ on the sleeve $v^{19}$ of the continuously-revolving bevel-gear $v^{25}$. From this construction it follows that if the trip $P$ is moved toward the rear of the machine the pawl $v^{17}$ engages the clutch member $v^{18}$ and causes the rotation of the disk $v^{15}$ and the shaft $v'$, (called the "word-shaft,") to which it is secured.

The trip $P$ is normally depressed, so that its nose is flush with the bottom of the justifying-channel, by means of a pair of swinging detents $p$ and $p'$, (shown perspectively in Fig. 26,) which are pivoted at $p^2$ to a block $p^3$, which is carried on the upper side of the plate $G^2$ over an opening $G^{14}$ in that plate provided for these detents. A pair of independent leaf-springs $p^4$, carried by the block $p^3$, bear on the squared upper ends of these detents, and thus tend to hold them in a vertical position. The detent $p$ has parallel edges and is of such length that when it is in engagement with the nose $P^2$ of the trip it holds the latter in its depressed position. The detent $p'$ is flaring, and its extreme length is the same as that of the detent $p$; but it is beveled at each side of its central line sufficiently to be able to swing above the nose of the trip $P$ when the same is elevated and by the influence of the spring $p^4$ depress the trip. These detents normally stand in the position shown in Fig. 8; but as the type is advanced by the block $G^4$ the first type strikes the detents, and they are forced to the rear until the type pass under them, the detent $p$ holding the trip depressed until the first type is over it, after which the type themselves hold it down. As soon as the first temporary space comes over the trip the notch $R'$ in the under side of the temporary space allows the trip to move upward under the influence of its spring $P^3$, whereupon the type next to the temporary space engages with the front side of the nose $P^2$ and moves the whole trip to the rear the distance allowed by the slots $P^{12}$ in the plate $P^8$, Fig. 5. This movement brings the temporary space just between the alined ejection-openings $G^{15}$ and $G^{16}$, Fig. 18, in the plate $G'$ on each side of the justifying-channel. The movement also withdraws the tongue $P^{10}$ from engagement with the pawl $v^{17}$, and thus initiates the rotation of the word-shaft $v'$, which first causes the substitution of a permanent space for this first temporary space and then advances the line for the next substitution.

*Space-substituting mechanism.*—Referring to Figs. 3, 4, 7, 10, 18, and 30, the first result of the rotation of the word-shaft $v'$ is produced by the cam $q$, which acts against the roller $q'$ on the link $q^2$, which yokes around the shaft $v'$ and at its other end is connected to the arm $q^3$, the upper end $q^4$ of which yokes around and is rigidly secured to the sleeve $q^5$, which is the hub of another lever-arm $q^6$, journaled on the stud $q^7$. The lever $q^6$ is connected at its upper end by a link $q^8$ with the ejector $Q$ through the stud $Q^5$, rigid with the ejector. The rear end of the ejector is enlarged, as at $Q'$, and slides between the guides $Q^2$ and $Q^3$, the forward end of the ejector passing through an opening $Q^4$, which guides it in line with that channel of the space-case which is at the point of ejection. A spring $q^9$, secured at one end to the lever $q^6$ and at the other to the frame $A'$, tends to draw this lever and hence the ejector forward and does so as the decreasing face of the cam $q$, comprised between the points $q^{10}$ and $q^{11}$, rotates by the roller $q'$. This portion of the rotation of the cam ejects the permanent space from the space-case through the opening $N^{12}$ into an intermediate member S, (called the "space-turner" and hereinafter described,) which turns it on its axis through ninety degrees (to turn the space from its flat side onto its edge) while the concentric face $q^{11}$ to $q^{12}$ of the cam is passing the roller $q'$. As the decreasing face $q^{12}$ to $q^{13}$ passes the roller the permanent space is forced the rest of the way into the line through the opening $G^{15}$, shoving the temporary space from the line into the opening $G^{16}$ and onto the upper end of the plate $r^{15}$, which, as hereinafter described, operates to elevate it into its own case $r$ out of the path of the succeeding temporary space ejected. That side of the nose $P^2$ which is nearest the space-case is beveled, as shown at $P^{11}$, Fig. 30, and the end of the notch in the temporary space coming against this bevel as the temporary space is ejected forces the trip downward until the upper surface of the nose $P^2$ is flush with the lower surface of the type-line, whereupon the trip swings forward beneath the type under the influence of the spring $P^9$. The next quarter-rotation of the cam $q$ operates to return the ejector to its normal position, and the last quarter is idle, as the cam-face from $q^{14}$ to $q^{10}$ is concentric. During this last quarter-revolution of the word-shaft $v'$ while the cam $q$ is idle other mechanism is operating to advance the selecting-block one unit and to advance the line until the next temporary space is engaged by the trip P. This mechanism will now be described.

*Mechanism for advancing selecting-block for each space substituted.*—I refer now more particularly to Figs. 2, 10, 14, 16, 17, and 27, the last mentioned being a bottom plan of the parts on the lower end of the screw L. This screw L, as hereinbefore described, is journaled in bearings $L'$ $L^2$, carried by the frame $A'$, and has at its lower end a ratchet $L^6$, with two teeth diametrically opposite. Loosely journaled on the shaft of this screw are the disk $L^4$ and gear $L^3$, rigid with each other. The disk carries the pawl $L^5$, which is pressed into engagement with the ratchet by the spring $L^7$. A toothed rack $l$ slides between the bearing $L'$ and the disk $L^4$ and is held in mesh with the gear $L^3$ by the pin $L^8$, depending from the bearing. This rack is formed on the link $l'$, which yokes around the word-shaft $v'$ and carries a roller $l^2$, which engages with the cam $l^3$ on the word-shaft. The roller is kept in engagement with the cam by the spring $l^4$, Figs. 2 and 14, compressed between the bearing $L'$ and a lug $l^5$ on the link, the spring being held in position by a rod $l^6$, which extends from the bearing $L'$ through the spring and through an opening in the lug $l^5$. The cam $l^3$ is concentric for substantially half its periphery, and this portion of the cam and the succeeding decreasing face constituting the third quarter were passing the roller during the substitution operation previously described. During the passage of this decreasing face the link $l'$ moves toward the left of Fig. 14 and rotates the gear $L^3$ half a rotation and carries the pawl $L^5$ to the diametrically opposite position to that it just occupied, bringing it into engagement with the other tooth of the ratchet. During the last quarter-turn of the cam $l^3$ the increasing face $l^7$ acts on the roller $l^2$ to force the link $l'$ to the right, and this rotates the gear $L^3$ in the opposite direction and causes the pawl $L^5$, acting through the ratchet-tooth, to turn the screw half a rotation in the direction to move the nut $k^5$ upward. There being twelve and one-half convolutions of each of the two threads of this screw to the inch, the half-rotation of the screw permits the selecting-block to advance under the action of spring $k^{15}$ one-half of this pitch, or .04 of an inch, which is one unit. This advancement of the block, as heretofore explained, operates to permit the swinging of the space-case to bring the next space into the ejection position when that next size is needed for the proper justification of the line, but otherwise produces no effect.

Figure 4:
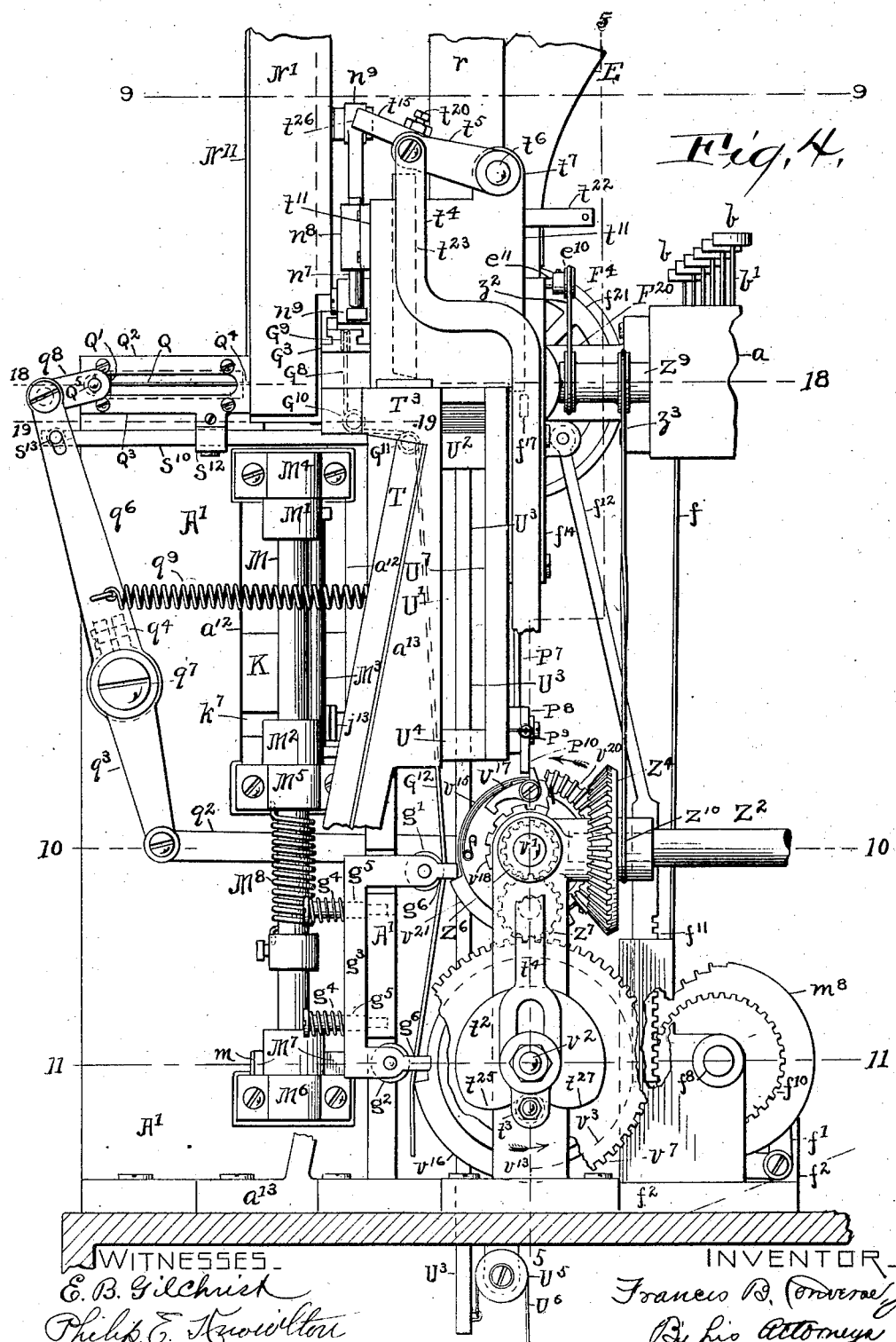
Figure 5:
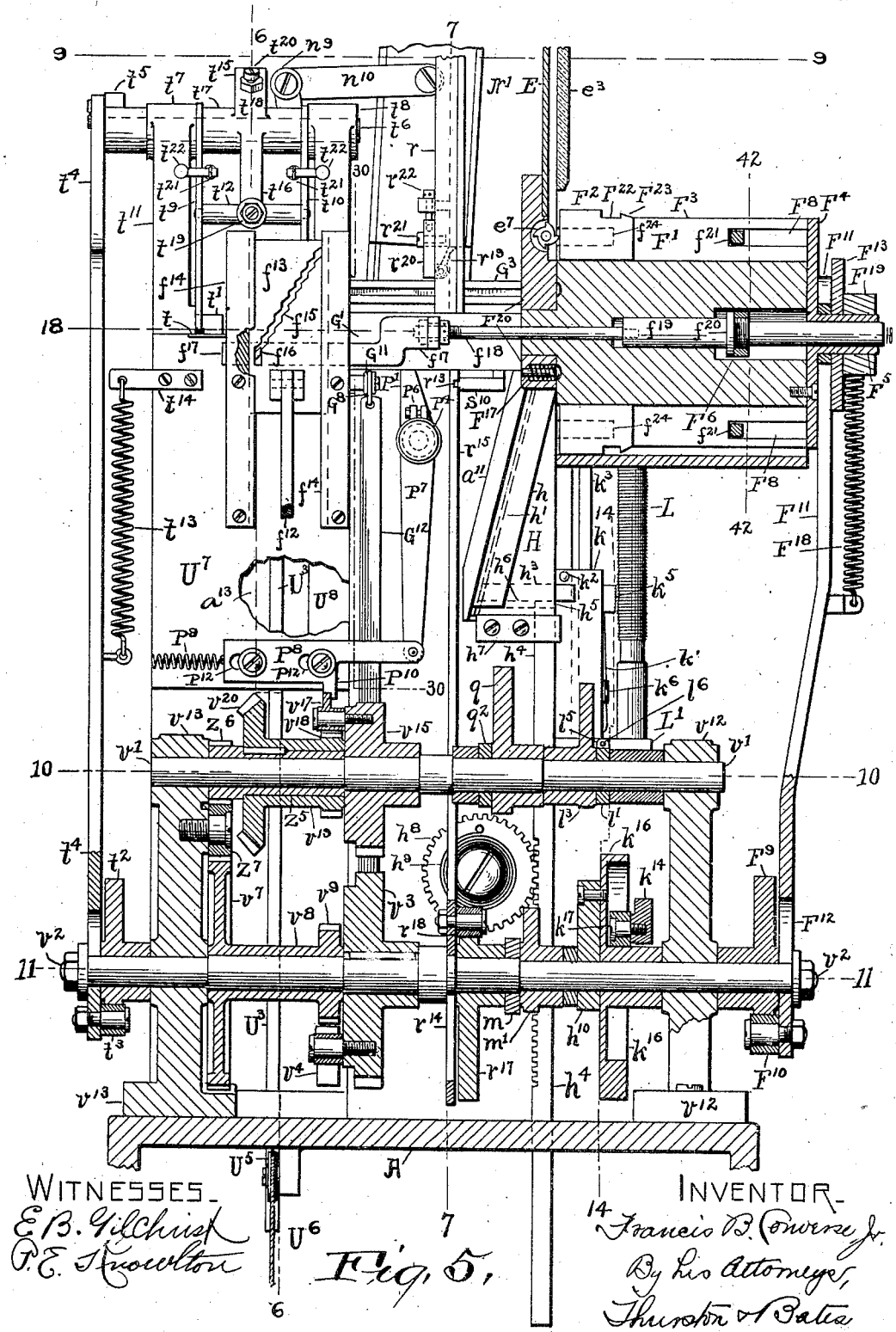
Figure 5 shows the cam $F^9$ in its position of rest, with the link $F^{11}$ in its extreme elevated position.
Figure 6:
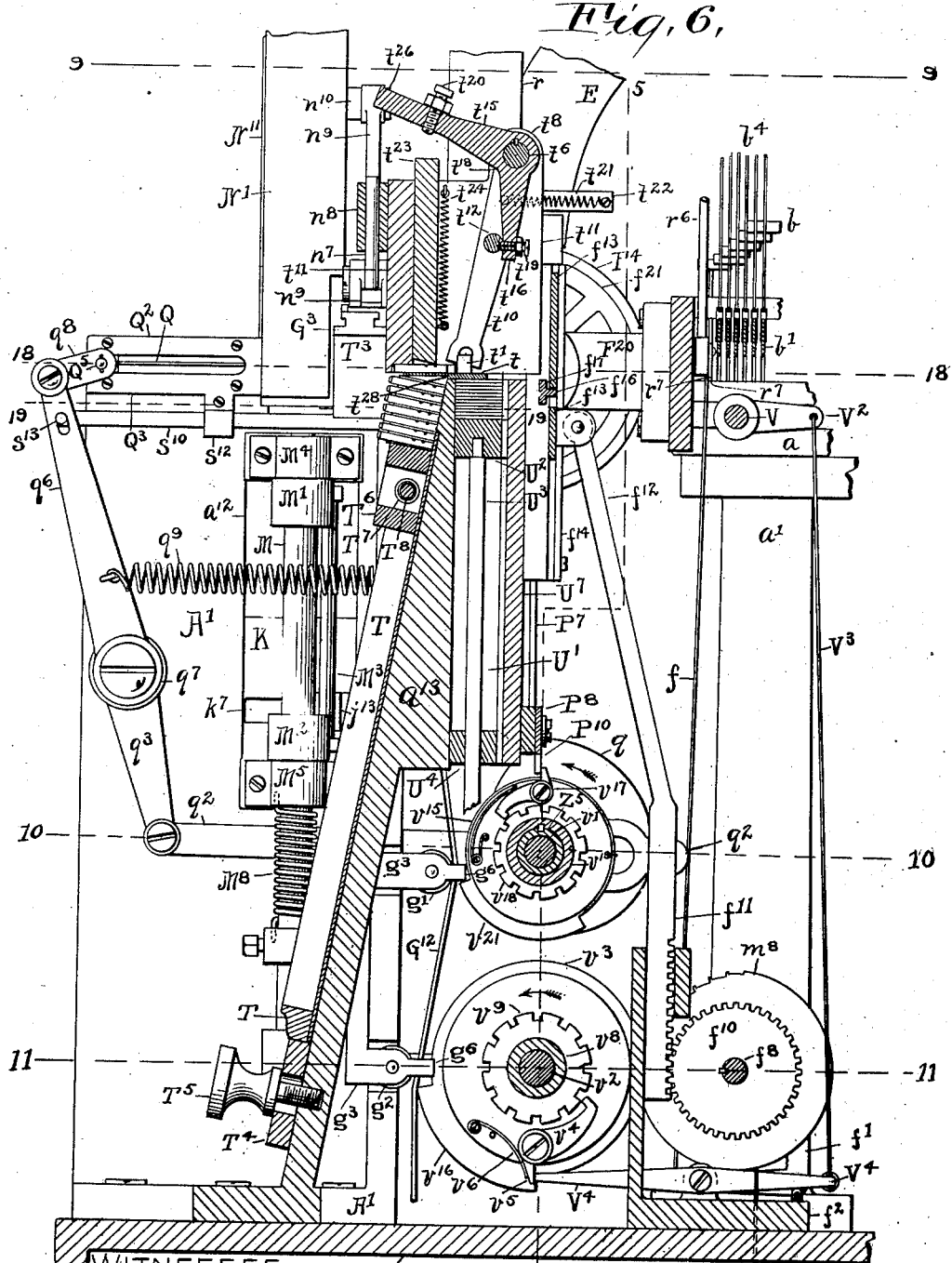

*Advancement of line after engagement of first temporary space.*—Referring now to Figs. 4, 5, and 6, the last quarter-revolution of the word-shaft $v'$, which caused the unit movement of the selecting-block just described, rotates the disk $v^{15}$ to bring the portion $v^{21}$ of greater radius into juxtaposition with the roller $g'$ and, gripping the strap $G^{12}$ between itself and the roller, draws down the strap until the next temporary space allows the elevation of the trip, and the trip's engagement with the type next to that space stops the movement of a line, as before, the portion $v^{21}$ slipping past the strap for the rest of the rotation of the shaft. The word-shaft does not come to rest at the completion of its revolution, however, for the tongue $P^{10}$ of the plate $P^8$ is moved out of the path of the pawl $v^{17}$ when the trip is moved by the type succeeding the second temporary space. Thus the same operations continue for each temporary space in the line.

To recapitulate: During substantially the first half of the rotation of the word-shaft a permanent space is substituted for a temporary space, during the next quarter-rotation the ejector is withdrawn, and during the last quarter-rotation the selecting-block is given its unit movement and the line advanced until the next temporary space is in line with the ejection-channel, when the operation is repeated. When the last temporary space has been ejected, the subsequent advancement carries the line over the galley, and as the follower after the last type moves out from under the detents $p$ and $p'$ they swing back to their vertical position under the influence of the spring $p^3$ and depress the trip into its normal position, and there being nothing to move the trip to the rear the plate $P^8$ remains under the influence of the spring $P^9$, with its tongue $P^{10}$ in the path of the pawl $v^{17}$, and as the rotation of the word-shaft succeeding the insertion of the last temporary space is thus completed the tongue $P^{10}$ engages with the pawl $v^{17}$ and disconnects it from the clutch member $v^{19}$, and thereupon the word-shaft stops. Just before the word-shaft $v'$ completes its rotation the surface $v^{21}$ on the disk $v^{15}$ passes beyond the roller $g'$ and releases the strap $G^{12}$, thus releasing the reciprocating block $G^4$, whereupon this block is returned to its initial position by the following mechanism: Referring more particularly to Figs. 2, 3, 9, 24, and 25, secured to the front side of the block $G^4$ is the cord $G^{20}$, passing over a sheave $G^{21}$ near the forward end of the rail $G^3$ and carrying at its lower end a small weight.
(Not shown.) Slidable within a hole extending vertically through the block $G^4$ above the rail $G^3$ is a pin $G^{25}$, on the top of which presses a leaf-spring $G^{22}$. A longitudinal passageway is formed through the block $G^4$, alined with a notch $G^{28}$ in the pin $G^{25}$. A key $G^{23}$, somewhat longer than the block and having a portion of its upper surface inclined, as at $G^{24}$, stands in the opening of the block and pin. The inclined surface of this key is so placed that when the front end of the key is flush with the front end of the block the incline is out of engagement with the pin; but when the key is moved forward relatively to the block the incline engages with the pin and raises it.

The pin $G^{25}$ when not raised by the key furnishes sufficient friction with the rail $G^3$ to hold the block in whatever position the advancing strap has left it against the return tendency of the light weight attached to the cord $G^{20}$. When, however, the last temporary space has been removed and the line of type is advanced over the galley, the block comes to its most rearward position and the rear end of the key $G^{23}$ impinges against the peg $G^{26}$, carried at near the rear end of the rail $G^3$, Fig. 3, and the key is thus shoved into the block, and its incline raises the pin $G^{25}$ out of engagement with the rail and allows the block $G^4$ to return toward its initial position, (bringing the follower $F^2$ with it,) under the influence of the weight on the cord $G^{20}$, as soon as the enlarged portion $v^{21}$ on the disk $v^{15}$ releases the strap $G^{12}$, the follower moving under the detents $p$ and $p'$ in the same manner that the first type moved when it was advanced. The reciprocating block $G^4$ comes to rest with the follower at the rear end of the assemblage-channel, in position to receive the first type set in that channel after it has been rotated into the assemblage position. This stoppage of the block is caused by the pawl $F^{25}$, carried on the upper side of the horizontal wing $F^3$, which forms the upper part of the channel just used, there being one of these pawls on each assemblage-channel. When the assembling of the next line is completed and the assemblage member given its quarter-revolution, the pawl $F^{25}$ moves downward out of engagement with the tongue $G^5$ of the reciprocating block $G^4$, and the latter returns under the influence of the weight on the cord $G^{20}$ to its initial position, whereupon the forward end of the key $G^{23}$ engages with a stop formed by the screw $G^{27}$, carried on the rail $G^3$. This moves the key relatively backward and allows the spring $G^{22}$ to force the pin $G^{25}$ into engagement with the rail to produce the desired friction, and thus the block is ready to be advanced behind the next succeeding line to be justified.

*Space-turner.*—I will now revert to the mechanism for turning the permanent space about its axis ninety degrees between its ejection from the space-case and its insertion into the line. This mechanism is provided so that the spaces may be allowed to lie on their flat sides in the case. The mechanism could be rendered unnecessary by placing the permanent spaces on their edges in the channels and making the partitions of the channel of a width decreasing as the spaces increase in thickness, (or making the rises on the steps of the block increase from the top to the bottom,) whereby the space-case is shifted from the center of one channel to the center of the next whenever the plunger moves down from one step to the next. It is preferable, however, to have the permanent spaces lie on their flat sides, as thus the case is able to contain more of them, especially of the smaller sizes, which in practice are most used.

I will now refer more particularly to Figs. 6, 7, and 18 to 23, inclusive. Figs. 20 and 21 are details in vertical section on the line 20 20 of Fig. 18 looking from the left end of the machine and show the space-turning cylinder in its normal and its turned positions, respectively.

The cylinder S (shown in perspective in Fig. 23) operates to turn the permanent space by receiving it along the axial line of the cylinder, which is rotated ninety degrees.
This cylinder S stands at the point of ejection between the space-case and the justifying-channel, being rotatably held in a bearing formed by the plate $G'$ and the plate $s$, secured to the upper surface of the plate $G'$ and beneath the rail $G^3$. In this cylinder is a kerf $s'$, extending from the center to the circumference and of a width substantially equal to the body of the spaces. A follower-strip $s^2$ stands in this kerf and is pressed toward the center of the cylinder by the springs $s^3$, carried by the strip and bearing at their free ends against a plate $s^4$, dovetailed into the cylinder and closing the kerf. The follower-strip $s^2$ is beveled on the end next the space-case, and thus a space may be ejected from that case into the cylinder beneath the strip, the strip simply rising above it and bearing on its upper surface.

In an annular groove $s^5$ around the space-turner is the segment of a gear $s^6$, of substantially a semicircumference, which meshes with a rack $s^7$, slidable in a groove $G^{29}$ in the plate $G'$. This rack $s^7$ is given sufficient movement lengthwise of the groove, as hereinafter described, to rotate the cylinder a quarter of a rotation, thus turning the permanent space with it the desired amount. The ejector $Q$ is a flat horizontal member of substantially the cross-section of the thinnest permanent space, and in order that it may pass through the cylinder S after the latter has turned ninety degrees (from the position shown in Fig. 20 to that in Fig. 21) a groove $s^8$ is formed in the bottom of the kerf $s'$ and a corresponding groove $s^9$ in the follower-strip $s^2$. The rack $s^7$ carries on its lower side a pin $s^{11}$, which projects through a slot $G^{30}$ at the base of the groove $G^{29}$ into a groove formed in the plate $s^{10}$. This plate is slidable through a notch in the upper part of the frame A' and through another bearing $s^{12}$. Fig. 22 is a detached plan of this plate. The rear end of the plate carries a stud $s^{13}$, which projects into a slot in the lever $q^6$, whereby when that lever is moved forward to eject a space the plate $s^{10}$ is also advanced. The pin $s^{11}$, normally stands at the forward end of the longitudinal branch $s^{14}$ of the groove in the plate $s^{10}$, and as the ejector-bar $Q$ is shoving the permanent space from the space-case into the cylinder S the plate is advanced under the action of the lever $q^6$ and the straight portion $s^{14}$ of the groove is moving by the pin until when the space is entirely within the cylinder the portion $s^{15}$ of the groove is opposite the pin, the arm $s^{18}$ having been shoved aside by the pin during the movement. A slight pause being allowed the plate $s^{10}$ by the concentric space $q^{11}$ to $q^{12}$ of the cam $Q$, as hereinbefore explained, the arm $s^{18}$, acting under the retraction of the spring $s^{19}$ on the pin, forces it crosswise of the plate in the portion $s^{15}$ of the groove. This movement of the pin $s^{11}$ moves the rack $s^7$, to which it is secured, and rotates the space-turner ninety degrees. The remainder of the movement of the plate $s^{10}$ while the ejector is shoving the space from the cylinder S into the line is idle, the pin $s^{11}$ standing in the longitudinal portion $s^{16}$ of the groove. When the ejector and the lever, and hence the plate $s^{10}$, are returning to their normal positions, the pin $s^{11}$ travels in the diagonal branch $s^{17}$ of the groove back to its normal position, and thus rotates the cylinder S back to its normal position.

*Temporary-space-case.*—Referring now more particularly to Figs. 7 and 28, the latter being an enlarged vertical section transversely through the center of the permanent-space case, as the temporary space is ejected from the line it is shoved into its own case $r$ just above the plunger $r^{15}$, which closes the bottom of that case. This plunger carries at its lower end a yoke $r^{14}$, which takes around the shaft $v^2$, whereby the plunger is allowed an up-and-down movement. In the side of the plunger is formed the diagonal groove $r^{13}$, which diverges downward from the horizontal something more than the width of the body of the temporary space and then upward the same amount. While the ejector is ejecting the permanent space from the space-case into the space-turner a pin $s^{20}$ on the side of the plate $s^{10}$, near the forward end thereof and standing just opposite the entrance to this groove, passes into the groove, and thus elevates the plunger and lets it down again. While the space is being shoved from the space-turner into the line and the temporary space is being shoved from the line onto the top of the plunger the pin $s^{20}$ is moving idly beyond the plunger $r^{15}$. When the plate $s^{10}$ returns toward its normal position after the insertion of the permanent space, the plunger $r^{15}$ is again elevated by the pin $s^{20}$, and this elevation raises the temporary space up into its case a sufficient distance to clear the next temporary space shoved into the case, after which the plunger moves downward to its initial position as the pin $s^{20}$ leaves the groove $r^{13}$. The temporary space is held in the space case by a sufficient friction to prevent its descending, this friction being applied in the present instance by a ball $r^{12}$, carried in a recess $r^{11}$ in the side of the temporary-space case and bearing against the lowest temporary space in that case through an opening at the inner side of the recess, toward which the ball is pressed by the leaf-spring $r^{16}$, secured to the side of the case. This friction is sufficient to uphold as many temporary spaces as there may be in any one line. After the delivery of the line the spaces thus supported by friction are shoved upward by the next rotation of the line-shaft. This operation is caused by the following mechanism: On the line-shaft $v^2$ is a cam $r^{17}$, which when the shaft is rotated operates on a roller $r^{18}$ on the plunger $r^{15}$ and raises this plunger until it has shoved the temporary spaces from the line just justified upward until the bottom one is above the pawl $r^{19}$, which holds the temporary spaces in this elevated position after the plunger has returned. This pawl $r^{19}$ is in a slot in the rear side of the temporary-space case, being pivoted to a lug in the forward side of a block $r^{20}$. This block is clamped by the screw $r^{21}$ after being adjusted by the screw $r^{22}$ into such position that one of the temporary spaces near the upper end of the temporary-space case is directly in line with the ejection-opening $r'$, there being a sufficient supply of temporary spaces in the temporary-space case so that there is always a temporary space opposite this ejection-opening.

*Delivery of the line.*—I will now refer particularly to Figs. 3, 4, 5, 6, 9, and 18. When the reciprocating block $G^4$ has been drawn to its extreme rear position by the strap $G^{12}$, after the last temporary space has been ejected, the line is left standing on the plate $t$, which forms a continuation of the bottom of the justifying-channel and extends across the mouth of the galley T. This plate is slidable back from that mouth in the grooves $T^2$, which are formed in the block $T^3$, against the lower side of which the removable galley T takes. This galley is supported on the frame $a^{13}$, which is inclined sufficiently to prevent the type falling out of the galley, and is secured to the bed A and frame A'. The galley is held in place by the adjustable block $T^4$, which is clamped beneath it by the thumb-screw $T^5$. Beneath the plate $t$ and between the sides of the galley is the follower-block $T^6$, given sufficient friction within the sides of the galley by the spring $T^7$, which acts through the pin $T^8$, around which it is coiled, and forces the movable strip $T^9$ against the side of the galley. At the beginning of the operation this follower-block $T^6$ is placed at the upper end of the galley, immediately beneath the plate $t$, and is adapted to receive the first line of type when the plate is withdrawn from under the same, and they are shoved downward by the delivery-plunger, as will now be described.

On the rear end of the line-shaft $v^2$ is a cam $t^2$, which acts on a roller $t^3$ on a link $t^4$, (shown in Figs. 3 and 5, but partly broken away in Fig. 4,) which is yoked around the shaft $v^2$. This link is normally drawn upward by the spring $t^{13}$, secured at its lower end to the link and at its upper end to a bracket $t^{14}$, fixed to the plate $U^7$, rigidly supported by the galley-frame $a^{13}$. The link $t^4$ is connected at its upper end to a rocker-arm $t^5$, secured to a rock-shaft $t^6$, journaled in bearings $t^7$ and $t^8$, formed in the bracket $t^{11}$, which is carried on the upper end of the galley-frame $a^{13}$. Loosely pivoted on the shaft $t^6$, between the bearings $t^7$ $t^8$, are the arms $t^9$ $t^{10}$, which engage with the lugs $t'$ on the plate $t$. These arms are joined together by a bar $t^{12}$ and are given a tendency toward the left of the machine by the springs $t^{21}$, secured to the arms and to brackets $t^{22}$, extending from the bearings $t^7$ and $t^8$. Rigidly secured to the shaft $t^6$, between the arms $t^9$ and $t^{10}$, is a bell-crank lever $t^{18}$, having the arms $t^{15}$ and $t^{16}$, the hub $t^{17}$ of the lever occupying the space between the arms $t^9$ and $t^{10}$. The arm $t^{16}$ of this lever carries a set-screw $t^{19}$, adapted to engage with the bar $t^{12}$, and the arm $t^{15}$ carries a set-screw $t^{20}$, adapted to engage with a plunger $t^{23}$. This plunger slides in suitable ways formed in the bracket $t^{11}$ and is of the same length as the justified line of type that stands beneath it. It is normally held up by the springs $t^{24}$, which are secured at their lower ends to the plunger and at their upper ends to the bracket $t^{11}$. Now when the line-shaft begins to rotate at the conclusion of the assemblage of the next line the increasing face $t^{25}$ of the cam acts on the roller $t^3$ and draws down the link $t^4$ and thereby rocks the shaft $t^6$ to move the arm $t^{15}$ of the bell-crank downward and the arm $t^{16}$ toward the left of the machine. As the arm $t^{16}$ moves to the left the springs $t^{21}$ cause the arms $t^9$ $t^{10}$ to follow it, and thus the plate $t$ is moved from under the line of type left standing on it, as previously described, whereupon the screw $t^{20}$ engages with the top of the plunger $t^{23}$ and shoves the type down toward the galley onto the follower-block $T^6$, if it happens to be the first line delivered, or onto the preceding lines of type. As the plunger thus delivers the justified line the extreme end $t^{26}$ of the arm $t^{15}$ engages with the pin $n^7$, slidable in a bracket $n^8$, secured to the opposite side of the bracket $t^{11}$. The lower end of this pin bears on one arm of the bell-crank lever $n^9$, which is pivoted to the bracket $t^{11}$, and has its other end connected by a link $n^{10}$ with the outer box N', carrying the space-case. The depression of this pin $n^7$, following the delivery of the line, swings the space-case to its extreme rear position, thereby lifting the plunger $n$ out of engagement with the selecting-block and to a point out of the path of the highest step on that block, thus allowing the block to be moved freely to the position required by the succeeding line. This movement of the selecting-block takes place during the passage of the concentric face of the cam $t^2$ past the roller $t^3$, whereby the spring $N^{13}$ cannot operate to swing the space-case toward the front until the decreasing face $t^{27}$ of the cam $t^2$ acts on the roller $t^3$, when the space-case comes into the proper position, determined by the selecting-block for the next line. As this decreasing face $t^{27}$ passes the roller the parts operated by the cam come into their initial position, the shaft $t^6$ rocking in the reverse direction and raising the arm $t^{15}$ and allowing the plunger $t^{23}$ to be elevated by its spring $t^{24}$. As soon as this elevation clears the path of the plate $t$ the arm $t^{16}$ acts on the bar $t^{12}$ of the arms $t^9$ $t^{10}$ and returns the plate $t$ to its normal position.

*Leading mechanism.*—Directly behind the galley-frame $a^{13}$ is a channel U' of proper dimensions to contain a supply of leads, one on top of the other. This channel is formed between the frame $a^{13}$ and the plate $v^7$. The side of the channel toward the rear of the machine is open, and the opposite side is formed by the plate $U^8$. (Shown in Fig. 5.) The channel contains a plunger $U^2$ on the upper end of a rod $U^3$, which passes through bearings in the block $U^4$, forming the bottom of the channel through the bed-plate of the machine, and has secured at its lower end a cord $U^6$, which passes over a pulley $U^5$ and carries at its end a weight. (Not shown.) The leads U are carried on the upper side of the plunger, as shown. That portion of the plate $t$ which is normally above the leads is of greater thickness than the part normally beneath the type, and when the plate is withdrawn to its extreme position the shoulder $t^{28}$, formed at the junction of these two thicknesses, comes behind the leads, whereupon the plunger forces the leads up against the thinner part of the plate, so that as the plate returns the shoulder will shove the top lead with it and deliver it onto the top of the line of type just delivered.

Figure 9:
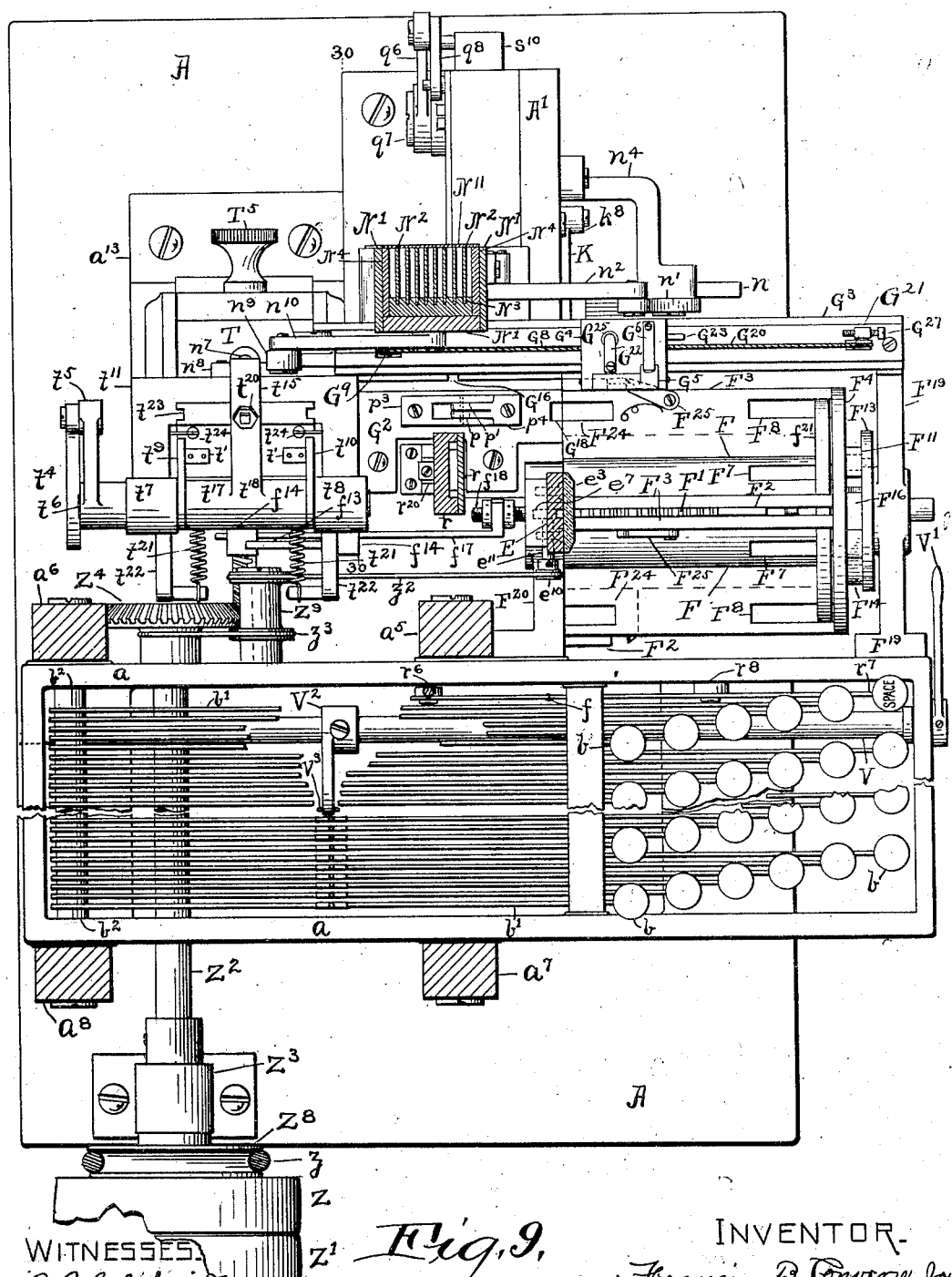
Figure 10:
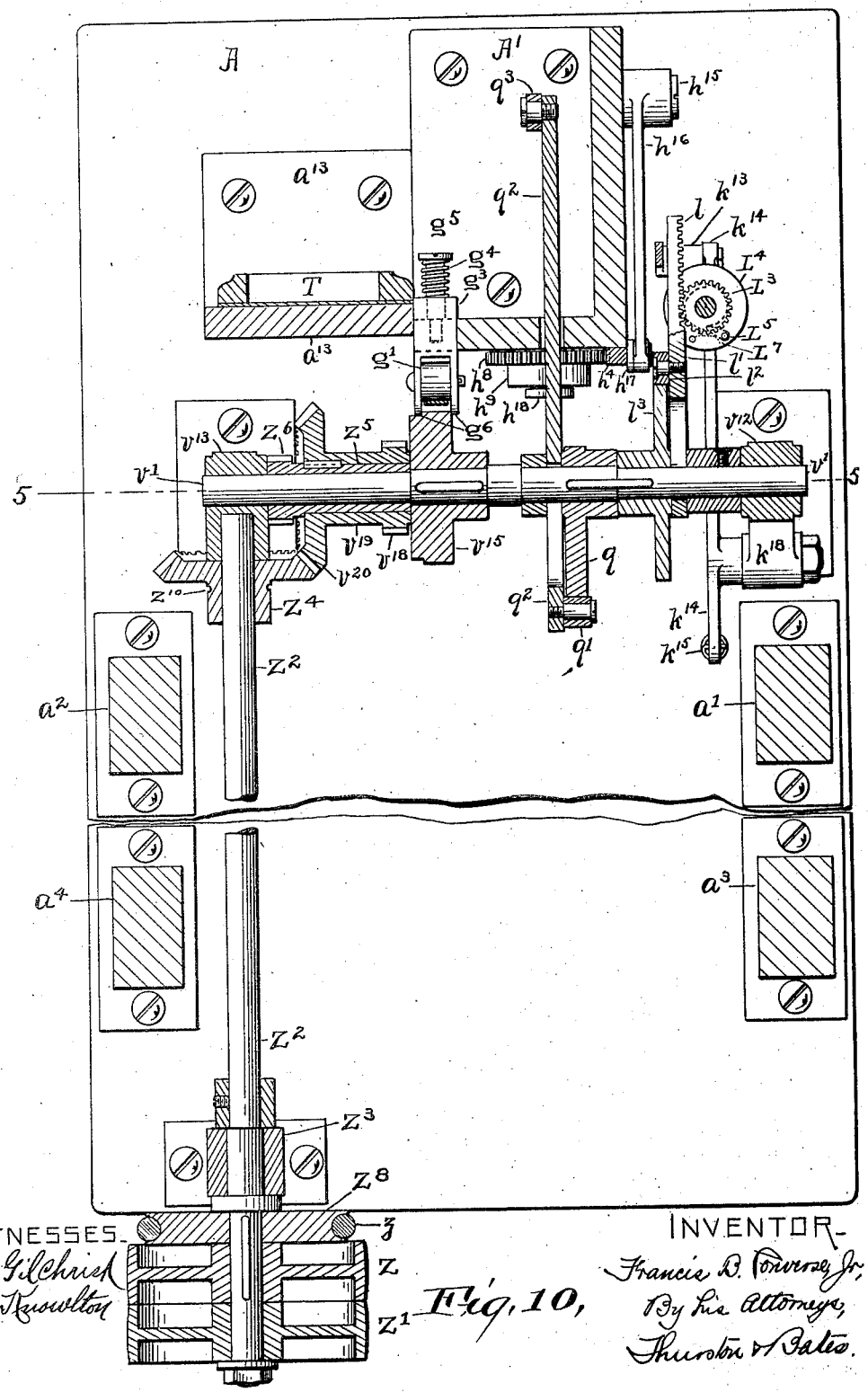
Figure 36:
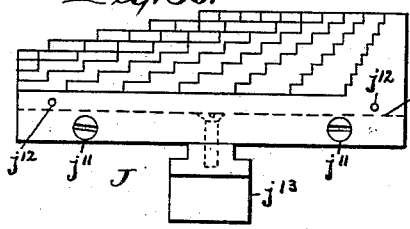
Figure 37:
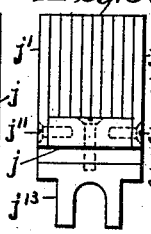

*Power.*—The machine is driven by the usual tight and loose pulleys, which are shown in Figs. 9 and 10 at Z and Z'. The tight pulley Z is rigid with the shaft $Z^2$, which is carried on a bearing $Z^3$ and a bearing formed in the standard $v^{13}$. Next to this standard the shaft carries a bevel-gear $Z^4$, which meshes with the bevel-gear $v^{20}$, keyed to the sleeve $Z^5$, which is journaled on the shaft $v'$. The rear end of this sleeve carries the spur-gear $Z^6$, which meshes with the idle gear $Z^7$, Figs. 4 and 5, which in turn meshes with the spur-gear $v^i$. Thus when the machine is in operation the gears $v^{20}$ and $v^i$ are continuously rotated, and these give continuous rotations to the clutch members $v^{18}$ and $v^9$. A belt $z$, Figs. 9, 10, 43, and 48, leads from the pulley $Z^8$ on the shaft $Z^2$ around the pulleys $C^4$ and $C^5$ on the left-hand ends of the cylinders C and C', respectively, of the setting mechanism, and thereby continuously drives these cylinders. The roller $d^2$ at the head of the race-plate is continuously revolved by the belt $z'$ passing from a pulley $d^3$ on the end of its shaft over a pulley (not shown) on the shaft of the cylinder C. The wiper-wheel $e^7$, Figs. 5 and 9, is continuously revolved by a belt $z^2$ running over the pulley $e^{10}$ on the shaft $e^{11}$ of the wiper-wheel and in one groove of a pulley $Z^9$, journaled on a stud projecting from the keyboard-frame $a$. This pulley is in turn driven by the belt $z^3$, Figs. 4 and 9, which runs in another groove in it and in a groove $Z^{10}$ in the hub of the gear $Z^4$.

I wish to emphasize the fact that while the specific construction I have above so fully described is my own design and in many instances amounts to invention my invention does not stop there, but extends, broadly, to the essential means employed to attain my results without regard to the specific mechanism employed. Therefore numerous modifications and mechanical equivalents may be substituted for various parts and the specific operation of subcombinations may be altered without departing from my broad invention.

Having described my invention, I claim—

1. The combination of a selecting-block having a series of steps rigid with relation to each other, a movable space-case containing spaces arranged in the order of their thickness, a plunger adapted by its position to determine the position of the space-case, said plunger adapted to engage with a selecting-block and having its position determined by the step with which it engages.

2. The combination of a series of permanent spaces arranged in the order of their thickness, a series of steps rigid with reference to each other and having treads at different heights dependent upon the position of the centers of successive permanent spaces, connecting mechanism between a step and the permanent spaces, and mechanism for moving the series of steps in the direction of their treads to select the step with which such mechanism shall connect.

3. The combination of a series of spaces, a space-selecting block, suitable connecting mechanism between the block and said spaces whereby the relative position of the block selects the proper size of spaces, mechanism for placing the selected spaces in a line of type being justified, and mechanism for periodically changing the relative position of the selecting-block and connecting mechanism during the justification of one line, which periodic changes are continuously progressive throughout the justification of the line and may accumulate at any point in the line to cause the selection of a different size of permanent space for the remainder of the line.

4. The combination of a series of spaces of varying size, a space-selecting block having an interrupted surface, a plunger adapted to engage therewith, a connection between the spaces and the plunger whereby the position of the latter determines the size of space selected, mechanism for causing relative movement between the plunger and selecting-block under two influences one dependent upon the measurement of the line to be justified and the other upon the number of spaces to be justified in that line, mechanism for placing selected spaces in the line to justify it, and mechanism for intermittently causing relative movement between the plunger and selecting-block during the justification of one line which intermittent movements accumulate to cause the plunger to pass out of engagement with that surface of the selecting-block with which it was engaging, whereby its position becomes changed.

5. The combination with a stepped selecting-block, a plunger adapted to engage with the steps thereof, mechanism whereby the position of said block and plunger with relation to each other determines the sizes of spaces to be in the justified line, mechanism for periodically changing said relative position during the justification of the line, said changes accumulating to cause the selection of a different size of space if such size is required to justify the line.

6. The combination of a space-case having a series of channels, a series of steps rigid with reference to each other and having rises dependent upon the distance between the centers of corresponding channels, connecting mechanism between the space-case and a step, and means for changing the step with which such mechanism connects during the justification of one line.

7. In a mechanism for justifying a line of type containing temporary spaces, space-selecting mechanism having a series of steps, mechanism whereby the position of said steps with reference to a suitable connection between them and permanent spaces determines the sizes of the permanent spaces in a justified line, mechanism for replacing the temporary spaces by the permanent spaces, and mechanism for periodically changing during the justification of one line the said relative position of the steps a definite distance, in combination with said connection between the steps and permanent spaces.

8. The combination of mechanism for measuring a line of type, a series of steps, a suitable connection between steps and permanent spaces, mechanism governed by the measuring mechanism and adapted to change the position of the steps with relation to the connection between them and the permanent spaces, mechanism for placing a permanent space in the line of type, and mechanism for periodically changing the position of the steps with relation to the connection between them and the permanent spaces during the justification of one line, which changes, accumulating, bring another step into action.

9. The combination of a selecting-block having a series of steps, mechanism whereby the position of said block determines the size of permanent spaces to justify a line of type, mechanism for placing such permanent space in such line, and mechanism for moving the selecting-block for each space so placed.

10. The combination, with a plurality of series of steps, the steps of succeeding series varying in size, of a set of permanent spaces varying in thickness, connecting mechanism between such permanent spaces and such steps, and mechanism for causing relative movement between such connecting mechanism and the steps.

11. In a justifying mechanism which uses a series of permanent spaces of definite individual thickness, a selecting mechanism including a plurality of series of steps, the steps of different series varying in size in the same ratio as the permanent spaces, connecting mechanism between the permanent spaces and a step, and mechanism for determining which step such connection engages.

12. In a justifying mechanism, a series of permanent spaces increasing in thickness by a common difference, connecting mechanism between such permanent spaces and a selecting mechanism, in combination with such selecting mechanism which consists of a plurality of series of steps, the steps of different series increasing successively by a common difference, and mechanism for altering the connection between the steps and the permanent spaces.

13. In a justifying mechanism, a series of permanent spaces increasing in thickness by a common difference, connecting mechanism between such permanent spaces and a selecting mechanism, in combination with such selecting mechanism which consists of a plurality of series of steps, the steps of different series increasing successively by a common difference, mechanism for placing in the line the selected permanent spaces thereby justifying the line, and mechanism for altering the connection between the steps and the permanent spaces periodically during such justification by an amount equal to the common difference between the steps of successive series.

14. A space-selecting block for a justifying mechanism composed of a plurality of stepped strips each of which strips overlap at an increasing ratio whereby the strips themselves constitute steps at right angles to the individual steps, the number of steps in one direction corresponding to the number of different sizes of permanent spaces which the machine is adapted to select and the number of steps in the other direction corresponding to the number of spaces between words which the machine is adapted to justify, in combination with mechanism for placing such permanent spaces in a line of type.

15. In a justifying mechanism, a series of permanent spaces increasing in thickness by a common difference, a plurality of series of steps, the treads of the steps of different series increasing successively by a common difference, but that end of the top step which is contiguous to the next step in each series being distant from a given line a distance proportional to the product of that series, counting from the series where the steps are shortest, multiplied by one plus the thickness of the thinnest permanent space, combined with connecting mechanism between the permanent spaces and a step, and mechanism for causing relative movement between such step and connecting mechanism to make the latter engage a different step.

16. In combination, a plurality of series of steps, a plunger adapted to engage with the treads of the steps and by its position determine the size of space to be in the justified line, mechanism for changing the relative position of the steps and plunger in the direction from one step to the next in the same series, mechanism for changing the relative position in the direction from one series to the next, one of said changes being dependent upon the measurement of the line and the other upon the number of spaces to be justified.

17. In combination, a plurality of series of steps, a plunger adapted to engage with the treads of the steps and by its position determine the size of space to be in the justified line, mechanism for placing in the line the selected spaces, thereby justifying the line, and mechanism for periodically altering during the justification of a line that relative position of the plunger and block which they maintained at the beginning of the justification.

18. A space-selecting mechanism including a plurality of series of steps and a suitable connection between them and permanent spaces, combined with mechanism for setting a line of type, a space-recording mechanism adapted to take account, as the line is being set up, of the number of spaces in the line independently of the selecting mechanism, measuring mechanism for determining the shortness of the line and means for delivering the results of the measuring mechanism and space-recording mechanism to said selecting mechanism.

19. In a mechanism for justifying a line of type, the combination of a plurality of series of steps, a plunger adapted to coöperate with said steps, mechanism for measuring the available space in the line to be justified and causing a relative movement between the plunger and the steps in a series dependent upon the amount of this space, mechanism for taking account of the number of spaces to be justified in the line and causing a relative movement between the plunger and the different series of steps, to bring into engaging position the series corresponding to this number, and mechanism actuated by said plunger whereby it causes the selection of the proper size of permanent spaces.

20. In a mechanism for justifying a line of type containing temporary spaces, the combination of a plurality of series of steps, a plunger adapted to coöperate with said steps, mechanism for measuring the available space in the line to be justified and causing a relative movement between the plunger and the steps in a series dependent upon the amount of this space, mechanism for taking account of the number of temporary spaces in the line and causing a relative movement between the plunger and the different series of steps, and mechanism for substituting such selected permanent spaces for the temporary spaces.

21. In a mechanism for justifying a line of type containing temporary spaces, the combination of a plurality of series of steps, a plunger adapted to coöperate with said steps, mechanism for measuring the available space in the line to be justified and causing a relative movement between the plunger and the steps in a series dependent upon the amount of this space, mechanism for taking account of the number of temporary spaces in the line and causing a relative movement between the plunger and the different series of steps, to bring into engaging position the series corresponding to this number, mechanism actuated by said plunger whereby it causes the selection of the proper size of permanent spaces, and mechanism for substituting such selected permanent spaces for the temporary spaces.

22. The combination of mechanism for setting a line of type and temporary spaces, mechanism for changing the temporary spaces for permanent spaces, and mechanism for determining the size of such permanent spaces, which latter mechanism includes a relatively movable selecting-block having a plurality of series of steps, there being mechanism adapted to shift such block in the direction from one step to another in the same series according to the available space for justification in the line, and mechanism adapted to shift said block in the direction from one series of steps to another series according to the number of spaces for justification in the line.

23. The combination with a set of permanent spaces graded in respect to thickness, of mechanism for assembling a line of type with temporary spaces at desired points, mechanism for taking account of the number of such temporary spaces, mechanism for measuring the space in the line available for justification, a stepped selecting-block which receives movement from each of the two mechanisms just mentioned and selects a permanent space which is the size next smaller than the quotient obtained by dividing the available space by the number of spaces, mechanism for replacing the required number of temporary spaces by this smaller size of permanent spaces, mechanism for moving the selecting mechanism to select the next larger size of permanent spaces, there being mechanism for substituting such larger size.

24. The combination of a selecting-block for a justifying mechanism, having a stepped surface, a space-case, a plunger suitably connected with the space-case and adapted to engage with different steps of the selecting-block and shift the space-case accordingly, and mechanisms for changing the relative position of the plunger and selecting-block under two influences, one of which is determined by the measurement of the line to be justified, and the other by the number of spaces to be inserted.

25. A space-selecting block for a justifying mechanism composed of a plurality of series of steps, the treads of the steps of different series increasing with successive series, a space-case containing permanent spaces graded in respect to thickness, a plunger connected therewith and adapted to engage with different steps of the block, mechanism for causing relative movement between the block and plunger in the direction from one step to the next in the same series proportionate to the amount of space available for justification, mechanism for causing relative movement between the plunger and block in the direction from one series to the next series proportionate to the number of spaces to be justified.

26. The combination of a plurality of series of steps, a case containing permanent spaces graded in respect to thickness, mechanism connecting the space-case with the steps whereby the position of the space-case is determined by which step the mechanism connects with, mechanism for causing relative movement between the steps and the connecting mechanism, the amount of which relative movement is determined by the measurement of the line to be justified and the number of spaces to be inserted into that line, and mechanism for ejecting from the space-case permanent spaces of a size dependent upon the position of that case.

27. The combination of mechanism for setting a line of type and temporary spaces, mechanism for measuring the shortness of the line, mechanism for keeping account of the number of temporary spaces inserted, a stepped selecting-block, mechanism for shifting the same to a position governed by the shortness of the line and the number of temporary spaces inserted, a case for permanent spaces, a connection between said case and the selecting-block whereby the position of the selecting-block determines the position of the space-case, and mechanism for alternately advancing the line to bring the temporary spaces to the point of substitution, and for substituting permanent spaces therefor.

28. In a mechanism for justifying a line of type and temporary spaces, a space-selecting block composed of a plurality of series of steps, the treads of the steps of different series increasing successively, combined with a plunger adapted to engage with different steps and by its position determine the size of permanent spaces to be in the completed line, mechanism for shifting said block relative to the plunger in the direction of the steps in any series a distance dependent upon the amount of space available for justification in the line, mechanism for shifting the selecting-block in the direction from one series to the next series a distance dependent upon the number of spaces for justification, and mechanism for alternately replacing a temporary space by a permanent space and then causing a movement of the selecting-block in the direction of the length of steps in a series a distance proportionate to the difference between successive sizes of permanent spaces.

29. The combination of a selecting-block for a justifying mechanism composed of a plurality of series of steps, the treads of steps of different series increasing successively by a common arithmetical difference, a case containing permanent spaces, a connection between said block and said case, mechanism for causing relative movement between the block and such connecting mechanism in the direction of the steps in any series dependent upon the shortness of the line to be justified and in the direction from one series to the next dependent upon the number of spaces in the line for justification, and mechanism for ejecting a permanent space from the space-case, mechanism for causing relative movement between the selecting-block and its connection with the space-case, which movement is in the direction from one step to another step in the same series, and is substantially equal to the common difference between the treads of the steps of successive strips.

30. The combination of a space-selecting block composed of a plurality of series of steps, mechanism whereby the position of said block determines the size of permanent spaces in the justified line, and mechanism for alternately changing a temporary space for a permanent space and moving the selecting-block a definite distance.

31. In a justifying mechanism, the combination of a plurality of series of steps, mechanism for taking account of the number of spaces for justification in a line, mechanism for measuring the line's variation from the required length, and automatic mechanism for selecting a series according to the number of spaces, and applying the line measurement to such selected series.

32. Mechanism for setting a line of type and interspersed temporary spaces, mechanism for taking account of the number of such spaces, mechanism for measuring the line's variation from the required length, a plurality of series of steps, automatic mechanism for selecting a series according to the number of spaces and applying the line measurement to such selected series, and from these two factors determining the size of permanent space to be in a justified line, in combination with a series of permanent spaces and automatic means for substituting them for the temporary spaces in the line.

33. In a justifying mechanism, the combination of a plurality of series of steps, mechanism for taking account of the number of spaces for justification in a line, mechanism for measuring the line's variation from the required length, and automatic mechanism for selecting a series according to the number of spaces and applying the line measurement to such selected series, and automatic mechanism for periodically advancing the line to bring the spaces between words into position for replacement by a permanent space selected by the preceding-mentioned automatic mechanism.

34. In a justifying mechanism, a plurality of series of steps, mechanism for taking account of the number of spaces for justification in a line, mechanism for measuring the line's variation from the required length, and automatic mechanism for selecting a series according to the number of spaces and applying the line measurement to such selected series, combined with mechanism for setting the line of type with interspersed temporary spaces, mechanism for replacing the temporary spaces by selected permanent spaces, and mechanism for returning the temporary spaces to a position where they may be again set in a line.

35. In a justifying mechanism, the combination of a plurality of series of steps, mechanism for taking account of the number of spaces for justification in a line, mechanism for measuring the line's variation from the required length, and automatic mechanism for selecting a series according to the number of spaces, and applying the line measurement to such selected series, and a case containing a series of permanent spaces graded in respect to thickness, and automatic mechanism for bringing into action the selected permanent space.

36. In a justifying mechanism, the combination of a plurality of series of steps, mechanism for taking account of the number of spaces for justification in a line, mechanism for measuring the line's variation from the required length, and automatic mechanism for selecting a series according to the number of spaces and applying the line measurement to such selected series and automatic mechanism for placing a permanent space selected by the above-specified mechanisms in the line, and automatic mechanism periodically operating during the justification of the line to vary the selection, the periodic movements accumulating and causing a change of size of permanent space at the proper point.

37. In a justifying mechanism, the combination of a plurality of series of steps, mechanism for taking account of the number of spaces for justification in a line, mechanism for measuring the line's variation from the required length, automatic mechanism for selecting a series according to the number of spaces and applying the line measurement to such selected series, a space-case containing spaces graded in respect to thickness, automatic mechanism for injecting spaces therefrom into the line, and automatic mechanism periodically operating during the justification of the line to vary the selection, the periodic movements accumulating and causing a change of size of permanent space at the proper point.

38. The combination of mechanism for setting a line of type and interspersed temporary spaces, a plurality of series of steps, mechanism for taking account of the number of spaces for justification in a line, mechanism for measuring the line's variation from the required length, and automatic mechanism for selecting a series according to the number of spaces and applying the line measurement to such selected series, a space-case containing spaces graded in respect to thickness, automatic mechanism for injecting spaces therefrom into the line, and automatic mechanism periodically operating during the justification of the line to vary the selection, the periodic movements accumulating and causing a change of size of permanent space at the proper point, and automatic mechanism for periodically advancing the line to bring a temporary space to the substitution position.

39. In a justifying mechanism, a plurality of series of steps, mechanism for taking account of the number of spaces for justification in a line, mechanism for measuring the line's variation from the required length, and automatic mechanism for selecting a series according to the number of spaces, and applying the line measurement to such selected series, combined with a setting-machine, a space-key therein adapted to cause the insertion of temporary spaces in the line and adapted also to actuate the mechanism for taking account of the number of spaces.

40. In a justifying mechanism, means for setting a line of type, a line-lever, mechanism operated by the latter for automatically transferring the assembled line from the setting mechanism to the justifying mechanism, in combination with such justifying mechanism consisting of a plurality of series of steps, mechanism for taking account of the number of spaces for justification in a line, mechanism for measuring the line's variation from the required length, and automatic mechanism for selecting a series according to the number of spaces, and applying the line measurement to such selected series.

41. In a justifying mechanism, the combination of a plurality of series of steps, mechanism for taking account of the number of spaces for justification in a line, mechanism for measuring the line's variation from the required length, mechanism for selecting a series according to the number of spaces and applying the line measurement to such selected series, mechanism for periodically advancing the line to bring the spaces between words into position for replacement by a permanent space selected by the preceding mechanism, mechanism for causing such replacement, and driving mechanism timed to automatically produce such measuring, selecting, replacing, and advancing movements in the proper order.

42. In a justifying mechanism, a plurality of series of steps, mechanism for taking account of the number of spaces for justification in a line, mechanism for measuring the line's variation from the required length, mechanism for selecting a series according to the number of spaces and applying the line measurement to such selected series, combined with mechanism for setting the line of type with interspersed temporary spaces, mechanism for substituting selected permanent spaces for the temporary spaces, and mechanism for returning the temporary spaces to a position where they may be again set in a line, and driving mechanism timed to automatically produce such measuring, selecting, substituting, and returning movements in the proper order.

43. In a justifying mechanism, the combination of a plurality of series of steps, mechanism for taking account of the number of spaces for justification in a line, mechanism for measuring the line's variation from the required length, mechanism for selecting a series according to the number of spaces and applying the line measurement to such selected series, a space-case containing spaces graded in respect to thickness, mechanism for injecting spaces therefrom into the line, mechanism periodically operating during the justification of the line to vary the selection, the periodic movements accumulating and causing a change of size of permanent space at the proper point, and driving mechanism timed to automatically produce such measuring, selecting, injecting, and periodic movements in the proper order.

44. The combination of mechanism for setting a line of type and interspersed temporary spaces, a plurality of series of steps, mechanism for taking account of the number of spaces for justification in a line, mechanism for measuring the line's variation from the required length, mechanism for selecting a series according to the number of spaces and applying the line measurement to such selected series, a space-case containing spaces graded in respect to thickness, mechanism for injecting spaces therefrom into the line, mechanism periodically operating during the justification of the line to vary the selection, the periodic movements accumulating and causing a change of size of permanent space at the proper point, mechanism for periodically advancing the line to bring a temporary space to the substitution position, and driving mechanism timed to automatically produce said measuring, selecting, injecting, advancing and periodic movements in the proper order.

45. In a justifying mechanism, the combination of a plurality of series of steps, mechanism for taking account of the number of spaces for justification in a line, mechanism for measuring the line's variation from the required length, and automatic mechanism for selecting a series according to the number of spaces, a shaft rotated once for each line to be justified, a cam on said shaft, a connection between said cam and the measuring mechanism, whereby the movement of the shaft automatically causes the line measurement once for each line.

46. In a justifying mechanism, the combination of a plurality of series of steps, mechanism for taking account of the number of spaces for justification in a line, mechanism for measuring the line's variation from the required length, and automatic mechanism for selecting a series according to the number of spaces, and applying the line measurement to such selected series, a shaft rotated once for each line to be justified, a connection between said shaft and the series of steps, whereby said shaft moves the series in the direction from one step to the next.

47. The combination of mechanism for setting a line of type and interspersed temporary spaces, accounting mechanism for taking account of the number of such spaces, mechanism for measuring the line's variation from the required length, a plurality of series of steps, a shaft rotated once for each line to be justified, connections between said shaft and said accounting mechanism and said series of steps, whereby the movement of the shaft automatically selects a series according to such account once for each line.

48. The combination of mechanism for setting a line of type and interspersed temporary spaces, mechanism for taking account of the number of such spaces, mechanism for measuring the line's variation from the required length, a plurality of series of steps, automatic mechanism for selecting a series according to the number of spaces and applying the line's measurement to such selected series, and from these two factors determining the size of permanent space to be in a justified line, in combination with a series of permanent spaces, means for substituting them for the temporary spaces in the line, a shaft rotated once for each word in the line, and a connection between the same and said substituting means to automatically cause such substitution.

49. In a justifying mechanism, the combination of a plurality of series of steps, mechanism for taking account of the number of spaces for justification in a line, mechanism for measuring the line's variation from the required length, and automatic mechanism for selelecting a series according to the number of spaces, and applying the line measurement to such selected series, mechanism for periodically advancing the line to bring the spaces between words into position for replacement by a permanent space selected by the preceding mechanism, and a shaft rotated once for each word in the line and automatically causing such advancement.

50. In a justifying mechanism, the combination of a plurality of series of steps, mechanism for taking account of the number of spaces for justification in a line, mechanism for measuring the line's variation from the required length, and automatic mechanism for selecting a series according to the number of spaces and applying the line measurement to such selected series and automatic mechanism for placing a permanent space selected by the above mechanisms in the line, mechanism adapted to operate periodically during the justification of the line to vary the selection, the periodic movements accumulating and causing a change of size of permanent space at the proper point, and a shaft operated once for each word and connected to cause such subsequent movement.

51. The combination of mechanism for setting a line of type and interspersed temporary spaces, a plurality of series of steps, mechanism for taking account of the number of spaces for justification in a line, mechanism for measuring the line's variation from the required length, and automatic mechanism for selecting a series according to the number of spaces and applying the line measurement to such selected series, a space-case containing spaces graded in respect to thickness, mechanism for injecting spaces therefrom into the line, mechanism adapted to operate periodically during the justification of the line to vary the selection, the periodic movements accumulating and causing a change of size of permanent space at the proper point, mechanism for periodically advancing the line to bring a temporary space to the substitution position, a shaft rotated once for each word, and cams on said shaft adapted to operate such injecting mechanism, periodic mechanism and advancing mechanism.

52. A plurality of series of steps, means for taking account of the number of spaces for justification in a line, mechanism 1 for measuring the line's variation from the required length, mechanism 2 for selecting a series according to the number of spaces, mechanism 3 for applying the line measurement to such selected series, a space-case containing spaces graded in respect to thickness, mechanism 4 for injecting spaces therefrom into the line, mechanism 5 adapted to operate periodically during the justification of the line to vary the selection, the periodic movements accumulating and causing a change of size of permanent space at the proper point, and mechanism 6 for periodically advancing the line to bring a temporary space to the substitution position, combined with a pair of shafts one operated for each line to be justified, and the other for each space in the line, and an operating connection between the first-mentioned shaft and the mechanisms above numbered 2, 3 and 4, and an operative connection between the second shaft and the mechanisms numbered 5, 6 and 7.

53. Means for setting a line of type, a space-key, mechanism operated thereby for setting temporary spaces in the line as it is being assembled, a plurality of series of steps, mechanism operated by said key for taking account of the number of spaces for justification in a line, mechanism 1 for measuring the line's variation from the required length, mechanism 2 for selecting a series according to the number of spaces, mechanism 3 for applying the line measurement to such selected series, a space-case containing spaces graded in respect to thickness, mechanism 4 for injecting spaces therefrom into the line, mechanism 5 adapted to operate periodically during the justification of the line to vary the selection, the periodic movements accumulating and causing a change of size of permanent space at the proper point, and mechanism 6 for periodically advancing the line to bring a temporary space to the substitution position, combined with a pair of shafts one operated for each line to be justified, and the other for each space in the line, and an operating connection between the first-mentioned shaft and the mechanisms above numbered 2, 3 and 4 and an operative connection between the second shaft and the mechanisms numbered 5, 6 and 7, and mechanism governed by the temporary spaces in the line for actuating said second shaft.

54. The combination with a stepped selecting-block, a space case containing permanent spaces arranged in the order of their thickness, a plunger connected with the space-case and cooperating with the selecting-block and by the step it is in engagement with determining the size of permanent space which is at the ejection-point, means for ejecting such permanent space into a line of type in place of a temporary space therein, and means for advancing the selecting-block a definite distance.

55. In a justifying mechanism adapted to operate on a line of type and temporary spaces, in combination, a space-selecting block, a line-shaft revolved for each line justified, and a word-shaft revolved for each space to be justified, connecting mechanism between the selecting-block and the line-shaft whereby the revolution of the latter moves the selecting-block in one direction, mechanism for taking account of the number of temporary spaces inserted and adapted to move the selecting-block a corresponding distance in another direction, mechanism operated by the word-shaft to advance the selecting-block a definite distance for each space substituted, a permanent space-case, a connection between the same and the selecting-block whereby the selecting-block determines the position of the space-case, mechanism operated by the word-shaft for substituting a permanent space for a temporary space.

56. In a mechanism for justifying a line of type a space-selecting mechanism having a series of steps, mechanism whereby the position of said steps with reference to a suitable connection between them and permanent spaces determines the size of permanent spaces in a justified line, in combination with said connection between the steps and permanent spaces, with a measuring-wedge adapted to measure collectively a plurality of line-spaces, and with connecting mechanism between the wedge and selecting mechanism.

57. In combination, mechanism for assembling a line of type, a wedge, mechanism for causing the same to measure the shortness of the line, mechanism including a series of steps for selecting the proper size of permanent spaces to justify the line according to the step which is in action, connecting mechanism between said selecting mechanism and the wedge, mechanism for placing a selected permanent space in the line, and mechanism for changing the relative position of the step which was in action.

58. A channel for holding a line of type, a wedge adapted to travel across said channel and compact the type therein against a stop, a guide for said wedge at an angle to said channel which angle is complementary to the angle of the wedge, whereby the wedge has its free edge at a right angle to the channel which in moving across the channel thus travels along it, combined with a space-selecting mechanism varied by said wedge.

59. The combination with a set of permanent spaces varying in thickness by a common difference, a measuring-wedge, a plurality of series of steps, connecting mechanism between the wedge and the steps, the size of the steps of different series being dependent at least upon the difference between the sizes of permanent spaces and the taper of the wedge, and connecting mechanism between the steps and the permanent spaces.

60. Means for holding a line of type, a single wedge of a taper independent of the number of spaces in the line, means for causing relative movement between such wedge and line for any line to be justified whereby the wedge measures the aggregate shortness of the line, irrespective of the number of spaces therein, combined with selecting mechanism varied by such relative movement.

61. In combination, mechanism for assembling a line of type, a wedge, mechanism for causing the same to move until stopped by the line becoming compacted against a suitable stop, whereby the travel of the wedge is dependent upon the shortness of the line, mechanism for selecting the proper size of permanent spaces to justify the line, and connecting mechanism between such selecting mechanism and the wedge whereby the selecting mechanism is varied proportionately to the shortness of the line, and mechanism for varying the selecting mechanism according to the number of spaces to be justified.

62. In a justifying mechanism, a wedge, mechanism for causing the same to move with reference to an assembled line of type until stopped by such line becoming compacted against a suitable stop, a space-selecting block, mechanism connecting the wedge and block whereby the latter moves a distance dependent upon the shortness of the line, mechanism for giving the block a different movement dependent upon the number of spaces to be justified, and mechanism connecting the block with permanent spaces graded in respect to thickness whereby the position of the block determines the size of permanent spaces used.

63. In a justifying mechanism, a wedge adapted to move across a line of type until stopped by taking up the space between the line and a suitable stop whereby the movement of the wedge is proportionate to the shortness of the line, a selecting-block composed of a plurality of stepped strips the treads of the steps of successive strips increasing by a common difference which is as many times the common difference between the permanent spaces as the height of the wedge is times its base, mechanism for moving this block in the direction from one step to the next on the same series, a distance substantially equal to the distance the wedge has moved, mechanism for shifting the block from one series to the next for each space to be justified, and mechanism connecting the selecting-block with permanent spaces varying in thickness by a common difference, whereby the size of the permanent space selected is dependent upon the available space for justification in a line and the number of spaces to be inserted.

64. The combination of a line-shaft and means for revolving it for each line to be justified, a measuring-wedge, a space-selecting block, and mechanism governed by the said line-shaft for causing the advancement of the wedge to measure the line, the proportional advancement of the selecting-block and the withdrawal of the measuring-wedge.

65. A selecting-block for a justifying mechanism composed of a plurality of series of steps, the different series increasing successively in the treads of their steps, combined with a measuring-wedge, mechanism for causing the advancement of the wedge to measure the line, the corresponding advancement of the selecting-block and the withdrawal of the wedge, and means for varying the series of steps which is in action.

66. In a justifying mechanism, in combination, a channel for holding the line to be justified, a wedge adapted to travel across the end of the line and thereby measure it, a line-shaft and means for revolving it for each line to be justified, and connecting mechanism between the shaft and the wedge, which operates to advance the wedge across the line and then withdraws it, and selecting mechanism which is varied by the travel of the wedge.

67. In a justifying mechanism, in combination a line-shaft and means for revolving it for each line to be justified, a wedge adapted to be moved across the line to measure it, a plate adapted to carry a selecting-block, suitable connections between the wedge and line-shaft and between the plate and line-shaft whereby the wedge is advanced to measure the line, the plate then advanced to a position determined by that of the wedge, and the wedge then withdrawn.

68. In a justifying mechanism, a measuring-wedge adapted to measure the shortness of the line and in doing so travel in two directions, a bar for operating the wedge having such connection with the wedge that the wedge may travel transversely of it, a line-shaft and means for revolving it for each line justified, and connecting mechanism between the shaft and said bar whereby the rotation of the shaft governs the movement of the bar and hence the wedge.

69. The combination with a selecting-block of a plate adapted to carry the same, a line-shaft and means for revolving it, for each line to be justified, a connection between the plate and shaft whereby the plate is moved as the shaft revolves, mechanism for recording the number of spaces inserted in the line and for shifting the selecting-block accordingly on the plate.

70. In a justifying mechanism, in combination, a plate movable longitudinally, a selecting-block carried by the plate and movable transversely thereon, mechanism for measuring the shortness of the line to be justified, connecting mechanism between such measuring mechanism and the plate whereby the latter is shifted longitudinally proportional to the shortness of the line, mechanism for recording the number of spaces in the line and connecting mechanism between this recording mechanism and the selecting-block operating to shift the selecting-block on the plate.

71. In a justifying mechanism, in combination, a longitudinally-movable plate, a selecting-block carried thereby and transversely movable thereon, a measuring-wedge, connecting mechanism between the wedge and the plate whereby the wedge is adapted to measure the shortness of the line and allow a corresponding movement of the plate, mechanism for recording the number of spaces in the line, connecting mechanism between such recording mechanism and the selecting-block adapted to shift the selecting-block transversely on the plate, a shaft operated for each line to be justified, and connecting mechanism between this line-shaft and the space-recording mechanism whereby the line-shaft governs the time when the space-recording mechanism shifts the selecting-block.

72. The combination of a selecting-block, a rotatable screw, suitable connection between the screw and block whereby the rotation of the screw allows the moving of the block, a plunger adapted to engage with the block and by its position determine the size of spaces, mechanism for placing such spaces in the line to justify it, and mechanism for intermittently rotating said screw during the operation of justification.

73. The combination of a permanent space-case containing spaces graded in respect to thickness, a stepped selecting-block, a plunger adapted to engage with the block, a connection between the plunger and space-case whereby the position of the latter is determined by that step with which the plunger is in engagement, mechanism for ejecting a permanent space from the space-case into the line in place of the temporary space, a nut and screw one of which is connected with the selecting-block and the other of which is turned about its axis for each permanent space substituted for a temporary space whereby the relative position of the plunger and selecting-block is changed for each space substituted.

74. In a justifying mechanism, in combination, a space-selecting block, a suitably-journaled screw and a nut adapted to engage said screw, a connection between said nut and selecting-block whereby the revolution of the screw operates to advance the selecting-block, a word-shaft rotated for each space to be justified, a connection between said shaft and the screw such that the shaft operates to turn the screw in one direction only, mechanism operated by the word-shaft for substituting a permanent space for a temporary space.

75. In a justifying mechanism, in combination, a rotatable screw, a block carrying a nut adapted to engage therewith, a measuring-wedge adapted to move the block along the screw, a selecting-block, a plate carrying said selecting-block, a dog carried by said plate and adapted to engage with the block carrying the nut to move the nut into engagement with the screw.

76. The combination of a space-case containing permanent spaces graded in respect to thickness, a selecting-block having steps, a plunger adapted to engage with said steps, a connection between the plunger and space-case whereby the relative position between the plunger and selecting-block determines the position of the space-case, mechanism for holding the plunger out of contact with the selecting-block, mechanism for shifting said selecting-block while the plunger is thus out of contact, and mechanism for thereafter releasing the plunger and allowing it to pass into engagement with the selecting-block.

77. In a machine for setting and justifying a line of type containing temporary spaces, in combination, a space-key, a space-recording mechanism, a space-selecting block, connecting mechanism between the space-key and the space-recording mechanism whereby a record is made as each temporary space is inserted, a line-shaft and means for revolving it for each line, connecting mechanism between said shaft and the space-recording mechanism whereby the latter is caused to deliver its result at the completion of the line set, connecting mechanism between the selecting-block and the space-recording mechanism whereby, when the line-shaft operates, the selecting-block is shifted a distance proportional to the number of temporary spaces inserted.

78. In a justifying mechanism, in combination, a disk having a series of engageable faces located at increasing distances from the center of the disk, a selecting-block composed of a plurality of series of steps, the distance between successive series being proportional to the difference between the radii of the corresponding faces on the disk, and connecting mechanism between said engageable faces on the disk and said selecting-block.

79. In a justifying mechanism, in combination, a disk having a stepped periphery, a selecting-block composed of a series of stepped strips, connecting mechanism between the selecting-block and the disk, which connecting mechanism includes a plunger adapted to engage with different steps on the disk and determine which strip of the selecting-block is brought into action.

80. The combination with a space-key and selecting mechanism, of a space-recording mechanism for keeping account of the number of spaces in the line, which includes a stepped disk, a ratchet connection between such disk and the space-key whereby the actuation of the space-key operates the ratchet without disturbing the disk, mechanism operated for each line to be justified which causes the rotation of the disk a distance determined by the ratchet, and connecting mechanism between the disk and the selecting mechanism whereby the latter is shifted proportional to the rotation of the disk.

81. The combination of mechanism for assembling a line of type and temporary spaces, a transferring member in which said line is assembled, a justifying-channel, mechanism for moving the transferring member with reference to the justifying-channel, a gage-piece moved away from the point of assemblage the thickness of the temporary space for each temporary space inserted, mechanism for measuring the line against such gage-piece.

82. The combination with means for assembling type, a revoluble member having a plurality of channels each adapted to receive the type and hold a line of it, a justifying-channel in line with one of the channels of the revoluble member when another channel is receiving type, mechanism adapted to measure the line when it is in the revoluble member, and mechanism for thereafter advancing the line along the justifying-channel.

83. The combination of a race-plate, an assemblage member having four channels ninety degrees apart, any of them adapted to receive the type coming down the race-plate into an assembled line, means for revolving the assemblage member ninety degrees to bring the assembled line into a horizontal position, a wedge, means for moving the same across the end of the assembled line in the assemblage member until stopped by compacting the line against a suitable stop, a space-selecting mechanism and means for communicating the movement of the wedge to such selecting mechanism.

84. The combination of a justifying-channel adapted to contain type, a follower-block adapted to shove the type along the channel, a strap connected with the follower-block and passing between two members, means whereby said members at desired times grip the strap frictionally and thereby advance the type, means for stopping the type and allowing the members to slip against the strap.

85. The combination of a justifying-channel adapted to contain type, a follower-block adapted to shove the type along the channel, a strap connected with the follower and passing between the periphery of a suitably-driven rotating member and another member, said rotating member having its periphery of different radii, the smaller radius allowing the strap to hang freely and the larger radius operating to grip the strap sufficiently to normally draw the follower but allow the strap to slip when the follower is held stationary.

86. In a justifying mechanism, in combination, a justifying-channel along which the type may travel, a follower adapted to travel through the channel behind the type, a block adapted to travel along parallel with the channel, said block having a tongue engaging with the follower, and means whereby at the end of the advancement the block returns with the follower to the front of the justifying-channel.

87. The combination with a transferring member having a channel in which type may be set up, a follower in such channel adapted to stand against the type, a justifying-channel, mechanism for moving the assemblage-channel into alinement with the justifying-channel, a reciprocating block adapted to engage said follower when the assemblage-channel is brought into such alinement, mechanism operating when the line is advanced to its extreme position to return the reciprocating block, to leave the follower in the assemblage-channel in position to engage the first type set when that assemblage-channel is again moved into the assemblage position.

88. The combination of a justifying-channel, a reciprocating block adapted to advance type along said channel, means for giving the block a tendency to return to its initial position, there being a frictional clutching device which normally overcomes said tendency, means for moving the block to advance the type and means whereby the friction-clutch releases its hold when the block arrives at its extreme position whereby the block returns toward its initial position.

89. In a justifying mechanism, in combination, a set of temporary spaces, a suitable justifying-channel, a trip adapted to enter said channel, mechanism for advancing a line of type and temporary spaces along the channel across said trip, the type preventing the trip entering the channel but the temporary spaces having notches into which said trip may move which movement allows the engagement of the trip by the type next following the temporary space, and mechanism whereby the advancement of the line of type after this engagement brings the temporary space for which a permanent space is to be substituted into the ejection-line and initiates the movement of mechanism causing such substitution.

90. In a justifying mechanism, in combination, a justifying-channel, a trip adapted to project into the channel, detent mechanism for holding said trip normally out of the channel, mechanism for advancing a line of type and temporary spaces through the channel, the type displacing the detent mechanism and themselves holding the trip out of the channel until a temporary space comes in apposition to the trip, and means whereby when this takes place the trip moves into the channel and the substitution of a permanent space for a temporary space is caused.

91. In a justifying mechanism, in combination, a case containing spaces, a channel, mechanism for moving a space from the space-case into said channel, an intermediate movable member adapted to receive the space, mechanism for moving such member to turn the space about its longitudinal axis in its transit from the space-case to said channel.

92. The combination of a case containing spaces, a channel into which said spaces are to be shoved, a space-turner between the case and the channel, an ejector, mechanism for moving the ejector through the case and space-turner and thereby shove a space into the channel, and mechanism for rotating said turner while the space is in it, said ejector passing through the turner after it is rotated.

93. In a justifying mechanism, in combination, a case containing permanent spaces arranged on their flat sides, a justifying-channel adapted to contain a line of type, mechanism for ejecting permanent spaces from the space-case into the line in the justifying-channel, an intermediate rotatable member between the space-case and the justifying-channel adapted to turn the spaces over from their flat side to their edge in their transit from the space-case to the justifying-channel.

94. The combination of a substantially vertical space-case having channels in which spaces of different size lie on their flat sides, a horizontal justifying-channel extending transversely of the space-case near its lower end, a space-turning member between the space-case and the justifying-channel and adapted to be rotated ninety degrees, mechanism for ejecting a permanent space from the space-case into such space-turner, mechanism for then rotating the space-turner ninety degrees, mechanism for completing the insertion of the permanent space into the justifying-channel.

95. The combination of a justifying-channel and a case containing permanent spaces arranged on their flat sides, and a space-turner located between the permanent-space case and the justifying-channel, said turner consisting of a cylinder having an opening along its axial line and having teeth on its periphery, a rack engaging therewith, and mechanism for causing said rack to rotate while the permanent space is within the turner, and mechanism for ejecting the permanent space from the case into the turner.

96. The combination of a justifying-channel having an entrance-opening and an exit-opening in line with each other, a temporary-space case stationary and in line with said exit-opening, a permanent-space case having a plurality of channels, said permanent-space case being movable and adapted to have any one of its channels in line with the entrance-opening, and an ejector adapted to shove a permanent space from its case into the channel and cause the ejection of the corresponding temporary space therein into its case.

97. In a type setting and justifying machine, in combination, cases containing type, a substantially vertical case containing temporary spaces, means for ejecting type from their cases and means for ejecting temporary spaces from near the upper end of their case, means for assembling such ejected type and spaces into a line, means for advancing such line opposite the temporary-space case near its lower end, means for forcing a temporary space from the line into the temporary-space case, and means for shoving the temporary spaces upward in the temporary-space case.

98. In a mechanism for setting and justifying type, a set of temporary spaces and a case therefor, a justifying-channel, means for moving a temporary space from the line in the justifying-channel into the temporary-space case, a plunger in the temporary-space case normally below the point of injection of the temporary space, means for raising the plunger after each injection sufficiently to elevate the bottom temporary space above the point of injection, and mechanism for giving said plunger a longer movement at the completion of the line to shove the temporary spaces up the temporary-space case and eventually bring them into a position where they may be again set by the depression of a space-key.

99. The combination of a series of channels containing type and arranged side by side, mechanism for ejecting type from said channels into chutes which converge at their lower end, a case containing temporary spaces, mechanism for ejecting the temporary space therefrom into a chute which terminates in common with the preceding-mentioned chutes, means for receiving the type and temporary spaces at the foot of the common chute into a line, a case containing permanent spaces, a justifying-channel which passes between the permanent-space case and the temporary-space case, means for advancing the line along the justifying-channel, means for moving a permanent space from the permanent-space case into the line and a temporary space from the line into the temporary-space case, and means for elevating the temporary spaces in the temporary-space case so as to cause them to come back into position to be again ejected into their chute.

100. The combination of a space-case, a plunger adapted to enter the lower end thereof, an orifice into the space-case above the normal position of the plunger, a pawl projecting into the space-case above the orifice, two mechanisms actuating the plunger, one giving it a movement beyond the orifice but not to the pawl and the other operating not so often and giving it a movement to the pawl, and means for maintaining temporary spaces within the space-case above the orifice and below the pawl.

101. In a justifying mechanism, a temporary-space case, a plunger in the lower part thereof, an entrance-opening into the space-case above the normal position of the plunger, there being room within the space-case above such entrance-opening sufficient to receive several temporary spaces, a pawl located in the upper end of such room and adapted to hold temporary spaces above it, mechanism for setting a line of type and temporary spaces which latter come from the temporary-space case above said pawl, mechanism for forcing the temporary spaces into the temporary-space case one by one, mechanism for operating the plunger each time a temporary space is inserted into the temporary-space case a sufficient distance to clear the opening, and mechanism operated at greater intervals for giving the plunger a larger movement to deliver the temporary spaces which are above it above the pawl extending into the temporary-space case.

102. A selecting-block for a justifying mechanism composed of a plurality of series of steps, the different series increasing successively in the treads of their steps.

103. A selecting-block for a justifying mechanism composed of a plurality of series of steps, the different series increasing successively in the treads of their steps by a common arithmetical difference.

104. A space-selecting block for a justifying mechanism, composed of a plurality of stepped strips, the treads of the steps of the different strips increasing in length from one side of the block to the other.

105. A space-selecting block for a justifying mechanism, composed of a plurality of stepped strips, the rises of all the steps on the block being the same, and the treads of the steps in any one strip being the same but the treads varying in the different strips.

106. A space-selecting block for a justifying mechanism composed of a plurality of stepped strips, the treads of the steps in different strips increasing in length over the steps of the preceding strip by a distance equal to the tread of the steps of the first strip.

107. A selecting-block for a justifying mechanism composed of a plurality of series of steps, the different series increasing successively in the treads of their steps, combined with a plunger adapted to engage with the treads of the steps and connected with permanent spaces, and mechanism for causing relative movement between the plunger and block during the justification of one line which may cause the plunger to pass into engagement with the next step.

108. A space-selecting block for a justifying mechanism, composed of a plurality of stepped strips, the rises of all the steps on the block being the same, and the treads of the steps in any one strip being the same but the treads varying by a common arithmetical difference in the different strips, combined with a plunger adapted to engage with the treads of the steps and connected with permanent spaces, and mechanism for causing relative movement between the plunger and block during the justification of one line which may cause the plunger to pass into engagement with the next step.

109. A channel for holding a line of type and temporary spaces, mechanism for measuring, while the temporary spaces are in the line, the amount which the line without the temporary spaces would be short of a predetermined length, combined with a selecting-block moved in accordance with said measuring mechanism, said selecting-block consisting of a plurality of series of steps, the top steps of successive series increasing over the top step of each preceding series by a greater difference than exists between the other steps of successive series.

110. In a justifying mechanism which uses a series of permanent spaces of different thickness, a selecting mechanism including a plurality of series of steps, the steps in different series increasing successively in the same ratio as the permanent spaces, and the corner of the top step which is nearest the other steps being in each case distant from the same line a distance equal to the length of the treads of the steps of that series, multiplied by one plus the thickness of the thinnest permanent space.

111. In a justifying mechanism, in combination, the block $G^4$, the key $G^{23}$ carried thereby, said key having an incline on its surface, a pin $G^{25}$ carried by the block, said pin having a shoulder with which the incline of said key may engage, a spring $G^{22}$ acting on said pin, said spring tending to move the pin in one direction and the incline of the key adapted to move it in the opposite direction, substantially as described.

112. In a justifying mechanism, the combination of a justifying-channel, a rail parallel therewith, a block $G^4$ adapted to travel along the rail, a tongue $G^5$ pivoted to said block, a spring adapted to hold said tongue in a definite position but allow it to be moved therefrom, and a follower adapted to move along the justifying-channel and having a notch with which said tongue may engage, substantially as described.

113. The combination with a justifying-channel, of a trip P adapted to enter the channel, a pair of pivoted detents $p$ and $p'$ normally extending into the channel opposite the trip, springs acting on said detents to hold them in their normal position, detent $p'$ having a beveled face and thus adapted by its spring to force the trip out of the channel and the detent $p$ adapted to hold it out, substantially as described.

114. A space-turner S having a kerf $s'$, a groove $s^8$ in the bottom of the kerf, a follower $s^2$ within the kerf, a groove $s^9$ in the follower opposite the groove in the kerf, substantially as described.

115. The combination of a plate $s^{10}$, having the longitudinal groove $s^{14}$ and the transverse groove $s^{15}$ connected with the groove $s^{14}$, a pin extending into said grooves, mechanism for reciprocating the plate relative to the pin, means whereby the pin is caused to travel across the grooves $s^{15}$ when that groove reaches it as said plate reciprocates, a space-turner connected with the pin and caused by it to rotate when the pin travels in the transverse groove $s^{15}$, substantially as described.

116. The combination of a temporary-space case, an ejector for forcing a temporary space into that case, a plate $s^{10}$ operated by the mechanism which operates the ejector, a pin $s^{20}$ carried by said plate, a plunger extending into the lower end of the space-case below its entrance-orifice, a diagonal shoulder $r^{13}$ in said plunger against which said pin is adapted to take, substantially as described.

117. The combination of the screw L, the block $k$ adapted to reciprocate parallel therewith, the arm $k'$ carried by said block, the nut $k^5$ carried by said arm, the movable plate K, the dog $k^9$ carried by said plate and adapted to engage with said arm, substantially as described.

118. The combination of the measuring-wedge H, the bar $h^4$ adapted to advance the same, the spring $h^9$, the gear $h^8$ which the spring tends to rotate, teeth on the bar $h^4$ meshing with the teeth on the gear $h^8$, a cam and suitable connections operating to move the bar the opposite direction from that in which the spring tends to move it, substantially as described.

119. The combination of the follower-block $G^4$ adapted to advance type along the channel, a strap $G^{12}$ connected with said follower-block, a pair of shafts, one actuated for each line set, the other for each space to be justified, a disk $v^3$ on the line-shaft, a disk $v^{15}$ on the word-shaft, said disks having portions of their periphery of greater radius than the remainder, rollers $g^2$ and $g'$ coöperating with the enlarged portion of the disks to grip the strap between them, substantially as described.

120. The combination, with means for setting a line of type, of a shaft $f^8$, a ratchet carried thereby, means for operating said ratchet for each space inserted into the line, a gear $f^{10}$ on said shaft, a rack $f^{11}$ meshing therewith, a plate $f^{13}$ moved by said rack and having a diagonal groove, a gage member against which the line set is adapted to be measured, and a connection between such gage member and diagonal groove whereby the position of the plate $f^{13}$ determines the position of the gage member, substantially as described.

121. The combination of the disk $m^8$ having steps of different radius on its periphery, a link $m$ adapted to engage with said steps, a suitable ratchet $f^7$, mechanism for turning the same through the angular distance between two successive steps of the disk for each space inserted, a wing $m^{13}$ carried by said ratchet, a projection $m^{23}$ from said wing, a pawl $m^{19}$ carried by the disk and adapted to be engaged by said projection $m^{23}$, substantially as described.

122. In combination, the ratchet $f^7$, the wing $m^{13}$, the pawl $m^{14}$, the disk $m^8$, having steps $m^{12}$, the pawl $m^{19}$ carried by the disk, the pawl $m^{14}$ carried by the wing, and the arm $m^{25}$ adapted to engage the pawl $m^{19}$, substantially as described.

123. The combination of the link $m$, means for moving the same, the disk $m^8$, a connection between the link and disk which causes the latter to move through an angular distance proportionate to the movement of the link, said disk having a series of engageable faces located at different distances from the center of the disk and adapted to be engaged by said link, substantially as described.

124. The combination of the ratchet $f^7$, the pawls $f^3$ $f^4$ engaging the same, one of said pawls being pivoted to a stationary member, and a suitable connection between the other pawl and the key for setting spaces, whose actuation thus rotates the ratchet, a shaft $v^2$, a lug $m^{28}$ revolved thereby and adapted to engage said pawls and withdraw them from the ratchet, and means for returning the ratchet to its initial position, and mechanism operated by said ratchet for varying a space-selecting mechanism according to the number of spaces in the line.

125. The combination of the ratchet $f^7$, the wing $m^{13}$ carried thereby, the projection $m^{23}$ on said wing, and the pawl $m^{14}$ carried by said wing, the disk $m^8$, the pawl $m^{19}$ carried thereby, and having a nose $m^{22}$ adapted to engage the projection $m^{23}$ and a lug $m^{20}$ adapted to be engaged by the pawl $m^{14}$, substantially as described.

In testimony whereof I hereunto affix my signature in the presence of two witnesses.

FRANCIS B. CONVERSE, JR.

Witnesses:
ALBERT H. BATES,
PHILIP E. KNOWLTON.